(12) United States Patent
Kim et al.

(10) Patent No.: US 9,405,325 B2
(45) Date of Patent: Aug. 2, 2016

(54) PORTABLE TERMINAL

(71) Applicant: LG ELECTRONICS INC., Seoul (KR)

(72) Inventors: Kihyun Kim, Seoul (KR); Jaehyun Sung, Seoul (KR); Sangdon Park, Seoul (KR); Inkeun Ryu, Seoul (KR); Jongwon Song, Seoul (KR); Ilgeun Kwon, Seoul (KR); Kidong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 98 days.

(21) Appl. No.: 14/550,492

(22) Filed: Nov. 21, 2014

(65) Prior Publication Data

US 2015/0192966 A1 Jul. 9, 2015

(30) Foreign Application Priority Data

Jan. 3, 2014 (KR) .......................... 10-2014-0000892
Jan. 7, 2014 (KR) .......................... 10-2014-0001961

(51) Int. Cl.
*G06F 1/16* (2006.01)
*H04M 1/00* (2006.01)
*G06F 3/02* (2006.01)
*G06F 3/041* (2006.01)

(52) U.S. Cl.
CPC .............. *G06F 1/1681* (2013.01); *G06F 1/162* (2013.01); *G06F 1/1624* (2013.01); *G06F 1/1643* (2013.01); *G06F 1/1679* (2013.01)

(58) Field of Classification Search
CPC ... G06F 1/1615; G06F 1/1616; G06F 1/1618; G06F 1/162; G06F 1/1675; G06F 1/1677; G06F 1/1681; G06F 1/1624; G06F 1/1643; G06F 1/1679
USPC ............. 361/679.26, 679.27, 679.55, 679.56, 361/679.58; 455/575.1, 575.3, 575.4; 345/168, 169, 905, 173
See application file for complete search history.

(56) References Cited

U.S. PATENT DOCUMENTS

| | | | | |
|---|---|---|---|---|
| 6,006,243 A * | 12/1999 | Karidis | ................. | G06F 1/1616 361/679.27 |
| 6,430,038 B1 * | 8/2002 | Helot | .................... | G06F 1/1616 248/917 |
| 6,437,973 B1 * | 8/2002 | Helot | .................... | G06F 1/1683 248/161 |
| 7,035,090 B2 * | 4/2006 | Tanaka | .................... | G06F 1/162 345/169 |
| 7,184,263 B1 * | 2/2007 | Maskatia | .............. | G06F 1/1616 248/917 |
| 7,239,505 B2 * | 7/2007 | Keely | .................... | G06F 1/1616 361/679.09 |
| 7,724,511 B2 * | 5/2010 | Jacobs | .................. | G06F 1/1681 361/679.05 |
| 8,520,377 B2 * | 8/2013 | Senatori | ................ | G06F 1/1681 361/679.26 |
| 8,902,585 B2 * | 12/2014 | Tseng | ................... | G06F 1/1607 361/679.09 |
| 8,917,498 B2 * | 12/2014 | Mai | ....................... | G06F 1/1683 361/679.02 |

(Continued)

FOREIGN PATENT DOCUMENTS

EP 1 548 545 A2 6/2005
WO WO 2011/133506 A2 10/2011

*Primary Examiner* — Nidhi Thaker
(74) *Attorney, Agent, or Firm* — Birch, Stewart, Kolasch & Birch, LLP

(57) ABSTRACT

A portable terminal having a first body, a second body and a hinge module connecting the second body to the first body such that the second body is movable relative to the first body is provided. The hinge module includes a first frame rotatably connected to the first body and a second frame connected to the first frame to support at least one portion of the second body in a supporting state, the second frame being connected to the second body such that the second frame is rotatable relative to the second body in order to allow the second body to rotate in the supporting state.

21 Claims, 20 Drawing Sheets

(56) References Cited

U.S. PATENT DOCUMENTS

| | | | | |
|---|---|---|---|---|
| 9,134,755 B2 * | 9/2015 | Onda | ............... | G06F 1/1601 |
| 9,261,910 B2 * | 2/2016 | Liang | ............... | G06F 1/1632 |
| 2001/0055197 A1 * | 12/2001 | Agata | ............... | G06F 1/1616 |
| | | | | 361/679.05 |
| 2004/0057197 A1 * | 3/2004 | Hill | ............... | G06F 1/1601 |
| | | | | 361/679.06 |
| 2004/0114315 A1 * | 6/2004 | Anlauff | ............... | G06F 1/162 |
| | | | | 361/679.28 |
| 2005/0052835 A1 | 3/2005 | Wu et al. | | |
| 2005/0105263 A1 * | 5/2005 | Tanaka | ............... | G06F 1/162 |
| | | | | 361/679.06 |
| 2009/0040701 A1 * | 2/2009 | Lin | ............... | G06F 1/1616 |
| | | | | 361/679.27 |
| 2011/0193783 A1 | 8/2011 | Kim et al. | | |
| 2012/0194977 A1 * | 8/2012 | Liu | ............... | G06F 1/162 |
| | | | | 361/679.01 |
| 2012/0229962 A1 | 9/2012 | Chen et al. | | |
| 2013/0242521 A1 * | 9/2013 | Lin | ............... | G06F 1/1624 |
| | | | | 361/807 |
| 2014/0002963 A1 * | 1/2014 | Mai | ............... | G06F 1/1679 |
| | | | | 361/679.01 |

* cited by examiner

PORTABLE TERMINAL

CROSS-REFERENCE TO RELATED APPLICATIONS

Pursuant to 35 U.S.C. §119(a), this application claims the benefit of earlier filing date and right of priority to Korean Application No. 10-2014-0000892, filed on Jan. 3, 2014, and Korean Application No. 10-2014-0001961, filed on Jan. 7, 2014, the contents of which are expressly incorporated by reference herein in their entireties.

BACKGROUND OF THE INVENTION

1. Field of the Invention

The present invention relates to a portable terminal whose first body is connected to a second body in such a manner that the first body is movable relative to the second body.

2. Description of Related Art

A portable terminal is a portable one that has at least one or more among a function of inputting and outputting information, a function of storing function and the like. The portable terminals have been in wide use because their convenience of being easily portable and being available everywhere for free use.

The portable terminals are categorized by body configuration into a bar type with a single body, a slide type with two or more bodies that are movable relative to one another, a folder type, a swing type and the like.

In more recent years, a tilting-type portable terminal whose one body rotates by a predetermined angle in a manner that slides with respect to another body has appeared on the market.

The tilting type portable terminal includes a hinge module that connects the bodies to one another in such a manner that the bodies are movable relative to one another. The tilting type portable terminals in the related art are limited in relative movement between the bodies. Thus, a hinge module with a novel construction is considered that realizes mechanism by which the bodies are movable relative to one another, taking on various forms.

In addition, the tilting type portable terminal includes a locking unit that fixes or separates frames that are connected rotatably to the body. However, the tilting type portable terminals in the related art are limited to types in which locking/locking-releasing mechanism is realized with a pushing-down operation, a hooking construction, and the like. Thus, the locking unit with a novel construction is considered that realizes the locking/locking-releasing mechanism in different ways.

SUMMARY OF THE DISCLOSURE

Therefore, an aspect of the detailed description is to provide a portable terminal that includes a hinge module with a novel construction in which one body of the portable terminal is movable relative to a different one, taking on more various forms.

Another object of the present invention is to provide a user interface associated with relative movement between bodies of a portable terminal.

A further object of the present invention is to provide a portable terminal that includes a locking unit with a novel construction in which frames are fixed to and are separated from a body of the portable terminal, taking on more various forms.

To achieve these and other advantages and in accordance with the purpose of this specification, as embodied and broadly described herein, there is provided a portable terminal including: a first body; a second body; a first frame that includes a hinge module which connects the second body to the first body in such a manner that the second body moves relative to the first body, the hinge module being rotatably connected to the first body; and a second frame that is connected to the first frame to support at least one portion of the second body in a supporting state, and that is connected to the second body in a manner that is rotatable relative to the second body in such a manner that when the second body rotates relatively in the supporting state, the supporting is released.

The portable terminal according to another embodiment of the present invention may further include a fixing portion that fixes the second body to the second frame in the supporting state.

In the portable terminal according to another embodiment of the present invention, the fixing portion may include a magnet that is provided to one of the second body and the second frame, and a metallic member that is provided to the other of the second body and the second frame, and that is formed in such a manner that a magnetic force of the magnet is exerted to the metallic member.

In the portable terminal, the metallic member may be configured to be changeable in polarity to change a direction of the magnetic force according to a control command.

In the portable terminal according to another embodiment of the present invention, the fixing portion may include a locking hole that is formed at the second frame, a manipulating member that is installed in the second body in such a manner that a pushing-down operation is able to be performed on the manipulating member, and a moving member that is configured to be movable by the pushing-down operation of the manipulating member, and that has a locking hook detachably engaged with the locking hole due to the moving of the moving member.

In the portable terminal, the fixing portion further includes an elastic member that exerts an elastic force to the manipulating member in order that the moving member, moved by the pushing-down operation of the manipulating member, returns to its previous position.

In the portable terminal, the moving member may be configured to move slidably on a rear surface of a display unit provided on the second body.

In the portable terminal according to another embodiment of the present invention, the fixing portion may include a projection that protrudes from one of the second body and the second frame, and an elastic member that is formed on the other one of the second body and the second frame, includes a hole into which the projection is inserted, and is made of elastic material, which changes a shape of a hole when the projection is inserted into the hole.

In the portable terminal according to another embodiment of the present invention, the second frame may be rotatably connected to the first frame, in such a manner that when the first frame rotates relative to the first body, one end portion of the second body moves on one surface of the first body in a sliding manner.

In the portable terminal, the second body may be configured in such a manner that the second body is rotatable about the one end portion relative to the second frame.

In the portable terminal, a locking recess may be formed in the one end portion of the second body, a stopper of which an end portion is inserted into the locking recess when the one end portion of the second body moves in a sliding manner may be provided to the first body, and a round portion in a curved shape may be formed on the inside of the stopper in order that the second body is smoothly rotatable relative to the second frame in a state where the second body is hooked onto the stopper.

In the portable terminal, a projection may be formed on at least one surface of the stopper, and the locking recess may include a first accommodation portion into which an end portion of the stopper is inserted when one end portion of the second body moves in a sliding manner, and a second accommodation that extends downward from the first accommodation portion and that is arranged to cover the projection that is inserted inward when the second body rotates relative to the second frame.

The portable terminal according to another embodiment of the present invention may further comprises a first hook that is provided to the first frame, and a latch bar that is installed in the first body, that has a second hook configured to be hooked onto the first hook to fix the first frame to the first body, and configured to move to release the hooking when a control command is applied.

The portable terminal may further include a motor that generates a driving force when the control command is applied; a pinion gear that rotates by the driving force of the motor and that has teeth which are formed at regular intervals along the circumference of one side of the pinion gear to push forward the latch bar; a limit watch that transfers a driving-stop signal for stopping the motor to a controller; and an elastic member that provides an elastic force in order for the latch bar to return to its previous position.

The portable terminal may further include a torsion spring that provides an elastic force in such a manner that when the latch bar moves and thus the connection of the first frame is released, the first frame rotates relative to the first body.

In the portable terminal, when in a state where the second body is arranged to cover the first body and a display unit provided to the second body is inactive, the control command is applied, the second body may move in a manner that slides with respect to the first body into the tilted position, and the display unit may switch to an active state.

In the portable terminal, when in a state where the second body is arranged to cover the first body in an overlapping manner, screen information in a first mode is displayed on a display unit provided to the second body, the second body rotates relative to the second frame, the screen information in a second mode different from the first mode may be displayed on the display unit.

The portable terminal according to another embodiment of the present invention may further: a touch sensor that is mounted in the second body, and senses a predetermined touch input; a motor that is installed in the first body and generates a driving force when the predetermined touch input is sensed; a first gear that rotates by the driving force of the motor; and a second gear that is connected a rotation shaft which rotatably connects the first frame to the first body and that is engaged with the first gear and thus rotates the first frame relative to the first body when the first gear rotates.

To achieve these and other advantages and in accordance with the purpose of this specification, as embodied and broadly described herein, there is provided a portable terminal includes a first body; a second body that is configured to move relatively between a first position in which the second body is arranged to cover the first body and a second position in which the second body is arranged to be inclined with the first body; and a hinge module that connects the second body to the first body in such a manner that the second body is movable relatively with first body, in which the hinge module includes a first frame that is rotatably connected to the first body, and a second frame that is rotatably connected to the first frame and that supports the second body when the second body moves relatively, and in which the first frame is changeable in length in such a manner that in the second position, an angle of the second body with respect to the first body is adjustable.

In the portable terminal according to another embodiment of the present invention, the first frame may include a stationary member; a moving member that is configured to be movable relatively with the stationary member; a guide rail that is installed in the stationary member along a direction of the relative movement of the moving member; and a guide member that is installed in the moving member and that is connected to the guide rail to guide the relative movement of the moving member.

To achieve these and other advantages and in accordance with the purpose of this specification, as embodied and broadly described herein, there is provided a portable terminal including: a base portion; a frame that is connected to the base portion in such a manner that the frame is rotatable relative to the base portion, a latch bar that is arranged in the base portion in such a manner that the latch bar is movable in opposite directions, locks the frame arranged to cover the base portion when the latch bar moves in one direction and releases the locking when the latch bar moves in the opposite direction, and a locking unit that is installed in each of the base portion and the latch bar and that is configured to move the latch bar using a magnetic force.

In the portable terminal according to another embodiment of the present invention, in a state where the frame is locked in the latch bar, a first hook may be hooked onto a second hook provided to the latch bar, and in a state where the locking is released, the first hook is separated from the second hook.

In the portable terminal according to another embodiment of the present invention, the locking units may be configured in such a manner that the locking units are connected to one another due to a magnetic force and the magnetic is overcome with an electromagnetic force when switching to a locking-releasing state takes place.

In the portable terminal, the locking unit may include a first locking unit that is installed in the latch bar and that includes a pin made of metal material that is responsive to the magnetic force, and a second locking member that is installed in the base portion and that includes a magnet which exerts the magnetic force and a solenoid coil that exerts the electromagnetic force to repulse the pin.

In the portable terminal, the second locking member may further include a bobbin that includes an accommodation portion within which at least one portion of the pin is accommodated in the locking state, and the solenoid coil may be wound around the circumference of the accommodation portion.

In the portable terminal, the magnet may be mounted on one side of the bobbin.

The portable terminal may further include an elastic member that is connected to each of the base portion and the latch bar and that applies an elastic force in such a manner that the latch bar moves in the one direction when the locking is released.

In the portable terminal, electric current may be prevented from flowing through the solenoid coil in such a manner that the latch bar moves in the one direction due to the elastic force of the elastic member.

In the portable terminal, the electric current may flow through the solenoid coil in the opposite direction in such a manner that the latch bar moves in the one direction due to the electromagnetic force.

In the portable terminal according to another embodiment of the present invention, the locking unit may include a solenoid unit that is mounted in the base portion and includes a pin that can protrude or be inserted due to the magnetic force or the elastic force, respectively, and a connection portion that is connected to each of the latch bar and the pin and moves the latch depending on whether the pin protrudes or is inserted.

In the portable terminal, the solenoid unit may include a body that is fixed to the base portion, a solenoid coil that is installed within the body, is arranged to surround the pin that is accommodated within the body, and when electric current is applied, exerts the electromagnetic force to the pin in a direction in which the pin is inserted into the body, and an elastic member that exerts the elastic force to the pin in a direction in which the pin protrudes from the body.

The portable terminal may further include an elastic member that is connected to each of the base portion and the latch bar and exerts the elastic force to move the latch bar in one direction in such a manner that the latch bar is able to return to its previous position after moving due to the protruding pin in the opposite direction.

In the portable terminal, a hole that communicates with the latch bar may be formed in the base portion in such a manner that a pressure-applying member is inserted into the hole and thus pushes the latch bar in one direction.

In the portable terminal according to another embodiment of the present invention, the locking units may be arranged in both sides of the latch bar in such a manner that a uniform force is able to be exerted to the latch bar, respectively.

In the portable terminal according to another embodiment of the present invention, a display unit may be rotatably connected to the frame, and the display unit may be arranged to entirely cover the base portion in the locking state and may be arranged tilted with respect to the base portion in the locking-releasing state.

The portable terminal according to another embodiment of the present invention may further include a manipulation unit for inputting a control command for driving the locking unit.

In the portable terminal, the manipulation unit may include a touch sensor for inputting a predetermined touch input.

According to another aspect of the present invention, a portable terminal having a first body, a second body and a hinge module connecting the second body to the first body such that the second body is movable relative to the first body is provided. The hinge module includes a first frame rotatably connected to the first body and a second frame connected to the first frame to support at least one portion of the second body in a supporting state, the second frame being connected to the second body such that the second frame is rotatable relative to the second body in order to allow the second body to rotate in the supporting state.

According to yet another aspect of the present invention, a portable terminal having a first body, a second body configured to move between a first position in which the second body is arranged to cover the first body and a second position in which the second body is arranged to be inclined with respect to the first body and a hinge module connecting the second body to the first body such that the second body is movable relative to the first body is provided. The hinge module includes a first frame rotatably connected to the first body and a second frame rotatably connected to the first frame, the second frame configured to support the second body when the second body moves relative to the first body.

The first frame is changeable in length such that, when the second body is in the second position, an angle of the second body with respect to the first body is adjustable.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure. In the drawings.

DETAILED DESCRIPTION OF THE DISCLOSURE

Figure 1:
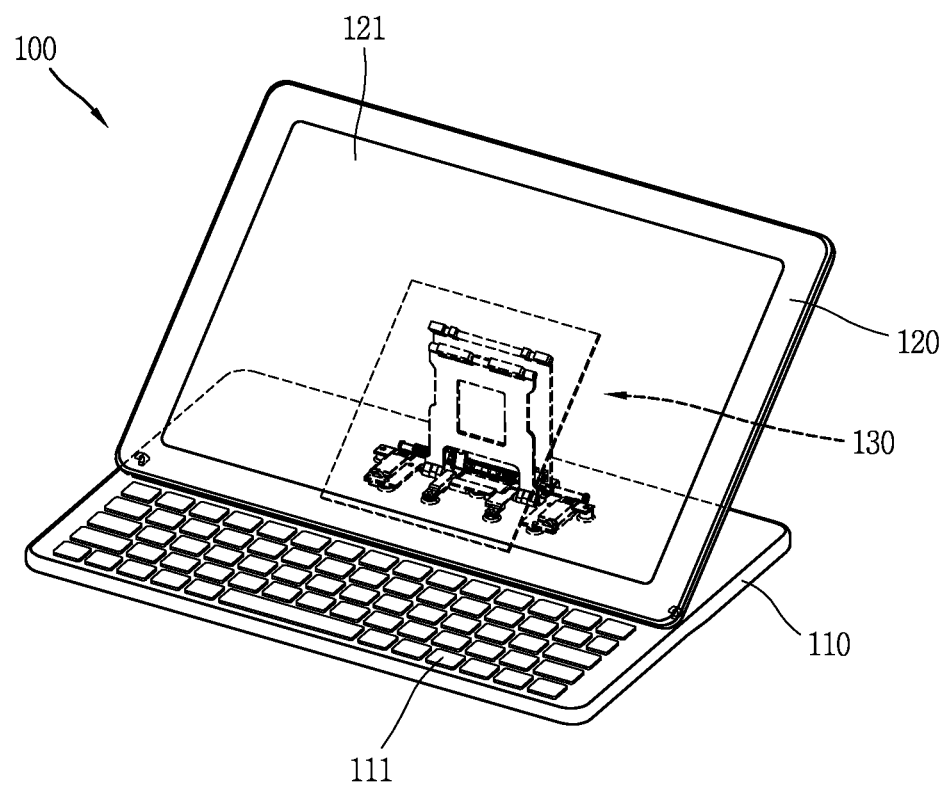
FIG. 1 is a diagram illustrating a portable terminal according to one embodiment of the present invention.

Description will now be given in detail of the exemplary embodiments, with reference to the accompanying drawings. For the sake of brief description with reference to the drawings, the same or equivalent components will be provided with the same reference numbers, and description thereof will not be repeated.

A portable terminal according to the present invention is described in detail below referring to the drawings.

Terms "module" and "unit" included in names of constituent elements described below are hereinafter used only for easily describing the constituent elements, and therefore are not intended to take on critical meanings. Therefore, the terms "module" and "unit" are interchangeably used.

In addition, a word expressed in the singular, used in the present specification may be construed as being in the plural, unless otherwise distinctively meant in the content.

FIG. 1 is a diagram illustrating a portable terminal 100 according to one embodiment of the present invention. Referring to FIG. 1, the portable terminal 100 includes a first body 110, a second body 120 and a hinge module 130 that connects the second body 120 to the first body 110 in such a manner that the second body 120 can move relative to the first body 110. The relative movement includes sliding and rotating (including tilting).

Usually, the first body 110 is placed on a flat surface of an object while in use. Various electronic components including a controller that controls the portable terminal 100 are built into the first body 110. As illustrated, a user input unit 111 is provided on an upper surface of the first body 110. The user input unit 111 is configured to be exposed to the outside in a state where the second body 120 moves in a manner that slides with respect to the first body 110 into a tilted position. The user input unit 111 may be configured in such a manner that the user input unit 111 is accommodated within the first body 110 in a state where the second body 120 is arranged in a manner that overlaps to cover the first body 110, and rises up and thus protrudes from one surface of the first body 110 when the second body 120 moves in a manner that slides with respect to the first body 110 into the tilted position.

A display unit 121, on which screen information is displayed, is provided to the second body 120. According to the present embodiment, as the second body 120 moves relative to the first body 110, the extent to which the display unit 121 is inclined with respect to the flat surface of the object is changed.

In this manner, by means of the hinge module 130, the second body 120 moves relative to the first body 110 between a position in which the second body 120 is arranged in a manner that overlaps the first body 110 and a position (position illustrated) in which the second body 120 moves in a manner that slides with respect to the first body 110 into the tilted position. In addition, as described below, the second body 120 is configured such that a tilting angle of the second body 120 with respect to the first body 110 is adjustable in a state where the second body 120 is tilted with respect to the first body 110 and in a state where the second body 120 is arranged to cover the first body 110.

The hinge module 130 with a novel construction is described in detail below by which the second body 120 moves relative to the first body 110, taking on various forms.

Figure 2A:
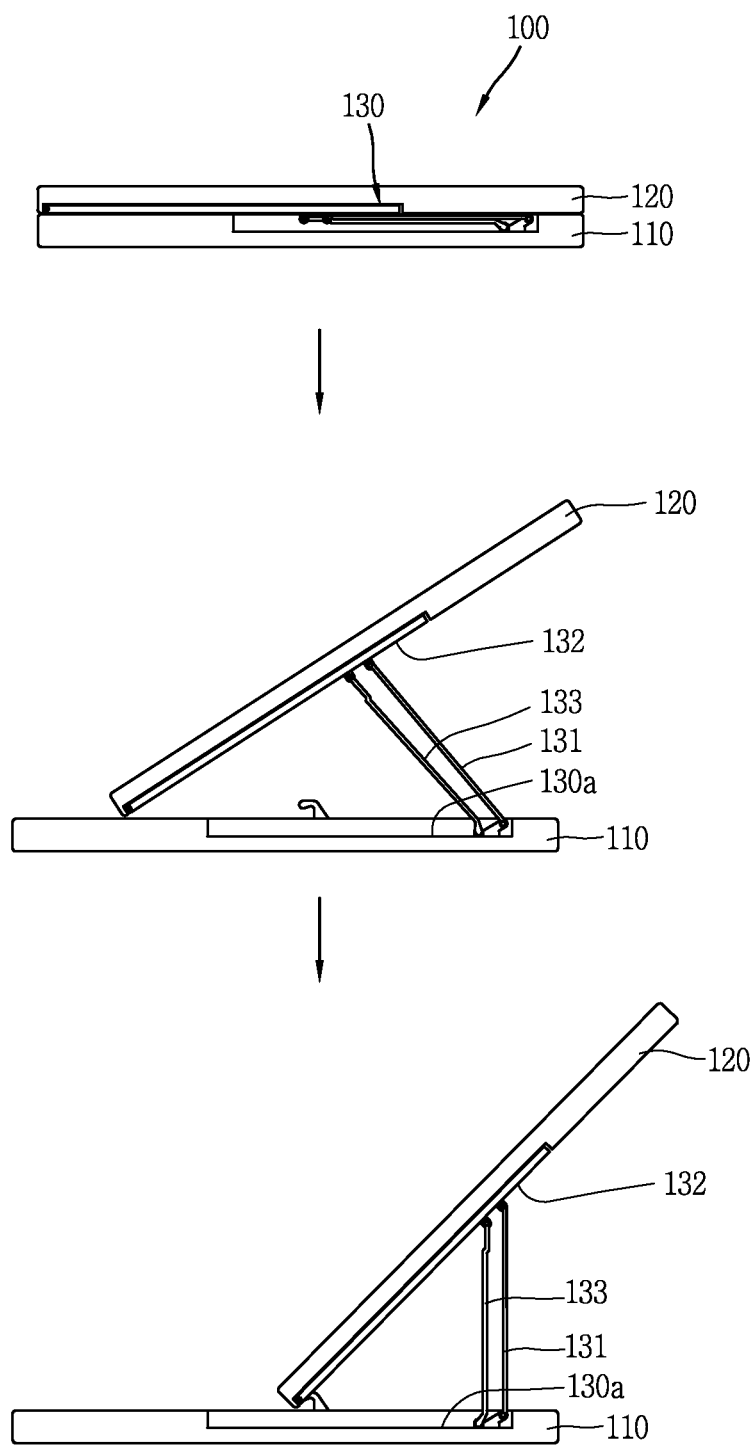
FIG. 2A is a diagram illustrating one example of a process of opening and closing the portable terminal illustrated in FIG. 1.
Figure 2B:
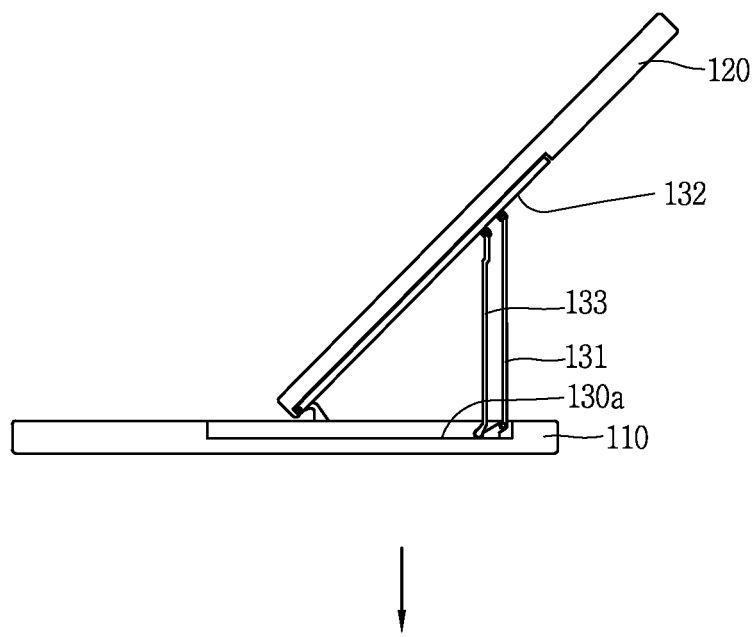
FIG. 2B is a diagram illustrating a process of adjusting an angle of the second body with respect to the first body in the portable terminal illustrated in FIG. 2A.
Figure 2B:
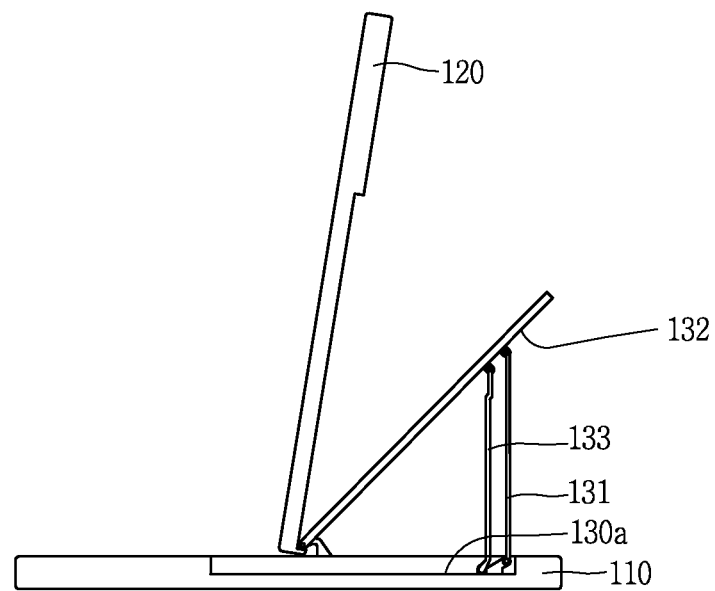

FIG. 2A is a diagram illustrating one example of a process of opening and closing the portable terminal illustrated in FIG. 1. FIG. 2B is a diagram illustrating a process of adjusting the angle of the second body 120 with respect to the first body 110 in the portable terminal 100 illustrated in FIG. 2A.

First, referring to FIG. 2A, the hinge module 130 includes a first frame 131 and the second frame 132. The first and second frames 131 and 132 of the portable terminal 100 are configured to be in the form of a thin plate such that the first and second frames 131 and 132 do not contribute greatly to increasing a thickness of the portable terminal 100. The first and second frames 131 and 132 are made of high-strength metal material or plastic material.

The first frame 131 is rotatably connected to the first body 110. The first frame 131 is connected to a rear portion of the first body 110 in such a manner that when the second body 120 moves in a manner that slides with respect to the first body 110 into the tilted position, the user input unit 111 arranged in a front portion of the first body 110 is exposed. A connection portion of the first frame 131 and a connection portion of the first body 110 have a hinge joint construction in such a manner that the first frame 131 and the first body can rotate about the connection member. For example, a pin may be connected to the connection portion of the first frame 131 and the connection portion of the first body 110 in such a manner that the first frame 131 and the first body 110 can rotate about the pin. A separate hinge member may be connected to the connection portion of the first frame 131 and the connection portion of the first body 110 in such a manner that the first frame 131 and the first body 110 can rotate about the hinge member.

The second frame 132 is connected to the first frame 131 and the second body 120 in such a manner that the first frame 131 and the second body can rotate relative to each other. The second body 120 is basically configured to rotate by means of the second frame 132, but may be fixed to the second frame 132 with a fixing portion 140 (FIG. 4), described below, in order to limit the rotation of the second body 130.

In a state where the second body is arranged in a manner that overlaps the first body 110, the first and second frames 131 and 132 are arranged in a manner that is roughly in parallel with the first body 110. The first and second frames 131 and 132 are accommodated within an accommodation portion 130a that is recessed from an upper surface of the first body, in such a manner that the first and second frames 131 and 132 are not exposed to the outside when the portable terminal 100 is viewed from side.

When in the state where the second body 120 is arranged in a manner that overlaps the first body 110, the first frame 131 rotates relative to the first body 110, the second body 120 rises up from the first body 110. At this time, in terms of configuration, the centroid is positioned below a rotation shaft or a torsion spring applies pressure to the other end portion of the second body 120. Thus, one end portion of the second body 120 moves on one surface of the first body 110 in a sliding manner.

The first frame 131 rotates by a predetermined angle and then the second body 120 stays tilted by a predetermined angle with respect to the first body 110. The second frame 132 is configured to support at least one portion of the second body 120 in this tilted state. Therefore, from the perspective of the second frame 132, it is apparent that the tilted state is a supporting state.

A third frame 133 is connected to the first frame 131 and the second frame 132 in a manner that can rotate the first frame 131 and the second frame 132, in such a manner that the second body 120 is tilted by predetermined tiling angle while moving in a sliding manner. Accordingly, the tiling angle of the second frame 132 is determined by a length of the first frame 131 and a length of the third frame 133 and the second body 120 is prevented from shaking while moving in a sliding manner.

Referring to FIG. 2B, in a state where the second frame 132 supports at least one portion of the second body 120, the second body 120 rotates relative to the second frame 132. In this case, the support is released. The second frame 132, described above, is rotatably connected to one end portion of the second body 120.

Accordingly, the tilting angle of the second body 120 with respect to the first body 110 is adjustable. As described above, if the display unit 121 is provided on the second body 120, a user rotates the second body 120 by an angle at which he/she can view the screen information in a suitable state.

The second body 120 that rotates relative to the second frame 132 is configured to freely stay at an arbitrary angle without any limit to a predetermined angle. Alternatively, the second body 120 may be configured to stay only at a predetermined rotation angle.

Figure 3:
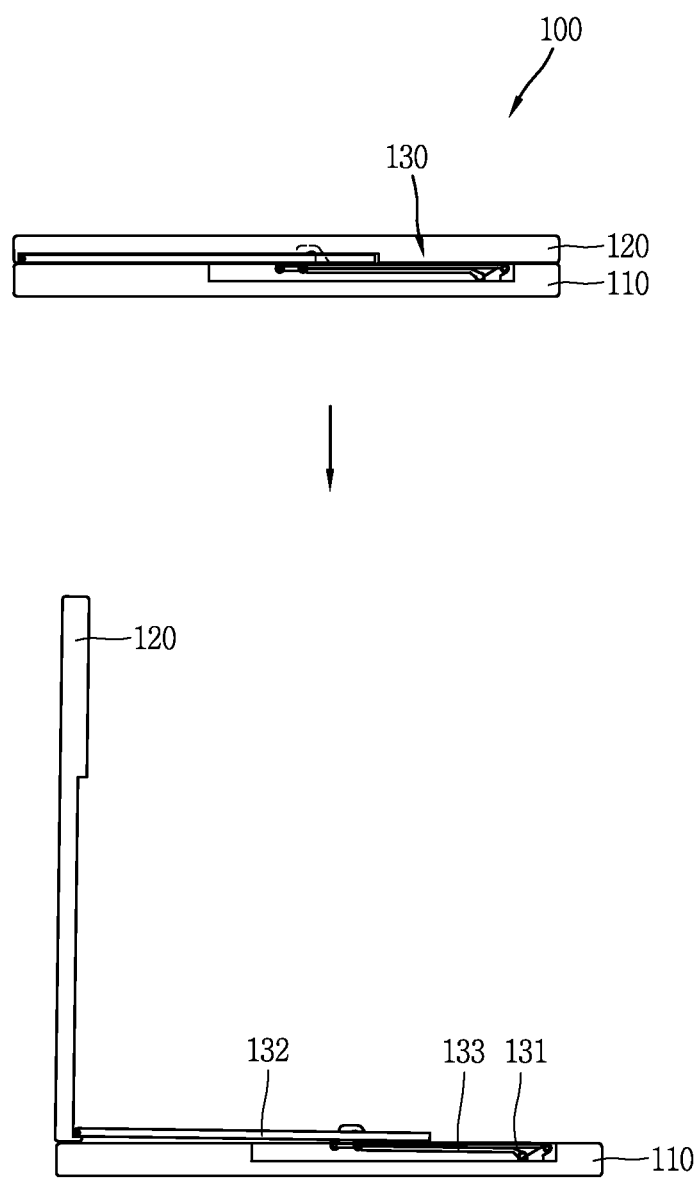
FIG. 3 is a diagram illustrating one example of a process of opening and closing the portable terminal illustrated in FIG. 1.

FIG. 3 is a diagram illustrating one example of a process of opening and closing the portable terminal 100 illustrated in FIG. 1. Referring to FIG. 3, with hinge module 130, the second body 120 may be configured in such a manner that in a state where the second body 120 is arranged to cover the first body 110, the tilting angle with respect to the first body 110 is adjustable. That is, in a state where the first and second frames 131 and 132 are accommodated within the accommodation portion 130a, the second body 120 rotates relative to the second frame 132.

In this case, the user input unit 111 is covered by the second body 120. This configuration is useful when the user wants to use the portable terminal 100 without operating the user input unit 111.

As briefly described above, the second body 120 is basically configured to rotate by means of the second frame 132, but may be fixed to the second frame 132 with the fixing portion 140 in order to limit the rotation of the second body 130. The fixing portion 140 according to various embodiments will be described in more detail below.

Figure 4:
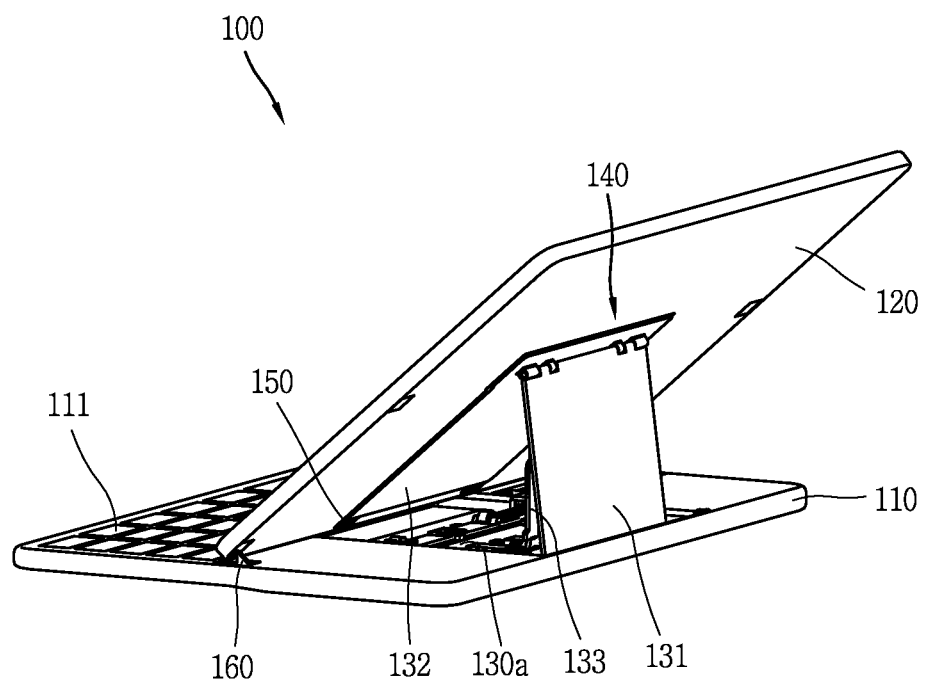
FIG. 4 is a diagram illustrating one example of the portable terminal according to the present invention.
Figure 5A:
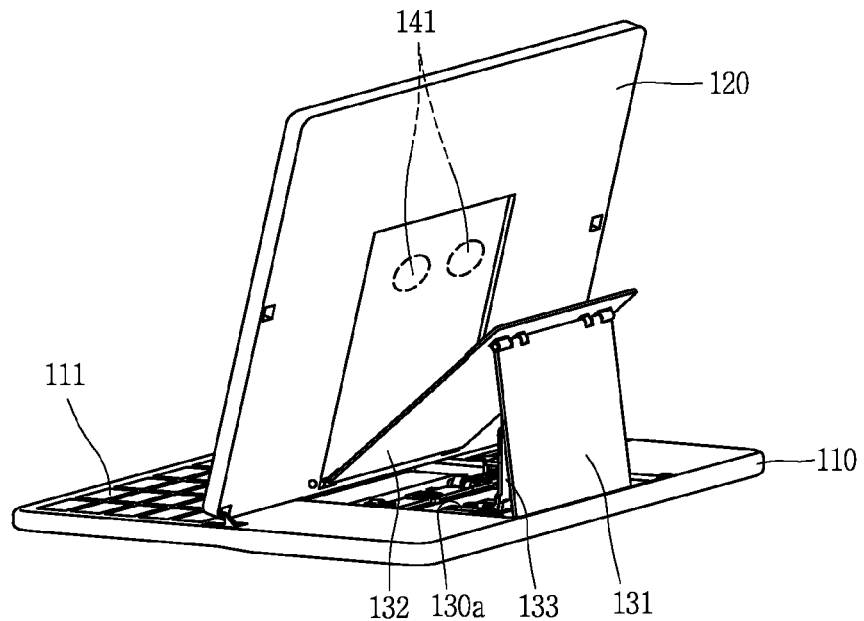
FIGS. 5A and 5B are diagrams illustrating the second body, illustrated in FIG. 4, that is separated from the second frame, when viewed from different angles.
Figure 5B:
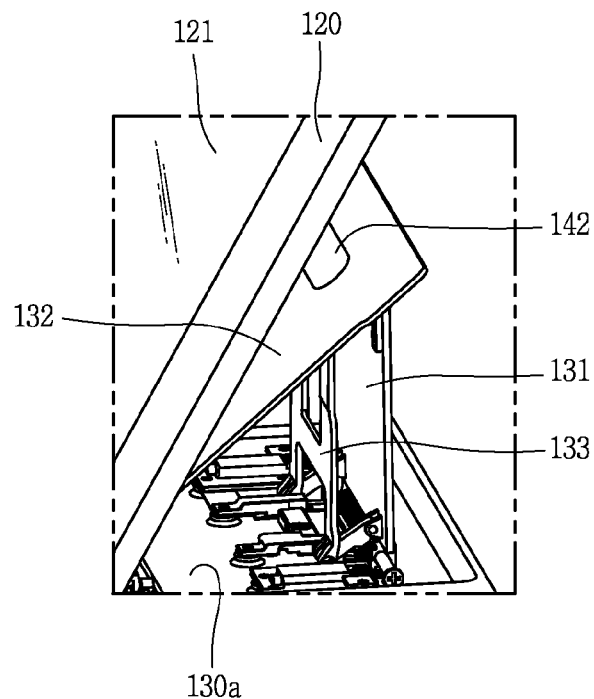

FIG. 4 is a diagram illustrating one example of the portable terminal according to the present invention. FIGS. 5A and 5B are diagrams illustrating the second body 120, illustrated in FIG. 4, is separated from the second frame 132, when viewed from different angles.

Referring to FIGS. 4, 5A and 5B, the fixing portion 140 is configured to fix the second body 120 to the second frame 132 using magnetic force, and includes a magnet 141 and a metallic member 142.

Specifically, the magnet 141 is provided to any one of the second body 120 and the second frame 132, and a metallic member 142 that is attracted by the magnet 141 is provided to the other. The metallic member 142 may be a common metallic member 142 that is not a magnet in itself, but is attracted by the approaching magnet, or a different magnet.

FIGS. 4, 5A and 5B illustrate that the magnet 141 is installed in the second body 120, and that the metallic member 142 is provided to the second frame 132. The magnet 141 that is to be provided to the second body 120 is installed within the second body 120 in such a manner that the magnet is not exposed to the outside. The second frame 132 may be made of metal material that is magnetic in itself As illustrated in FIG. 5B, a separate metallic member 142 may be installed in the second frame 132. If the separate metallic member 142 is installed in the second frame 132, the metallic member 142 is inserted into an accommodation pocket formed in the second frame 132 in order that the separate metallic member 112 cannot prevent the second frame 132 and a surface that faces the second body 120 from coming into close contact with each other without any space in between. In a supporting state, the metallic member 142 is arranged to face the magnet 141.

The attraction of the metallic member 142 by the magnet 141 fixes the second body 120 to the second frame 132. For example, the second body 120 is fixed to the second frame 132 and thus is supported in the state where the second body 120 described above is arranged in a manner that overlap the first body 110 and in the state where the second body 120 moves in a manner that slides with respect to the first body 110 into the tilted position.

When, in a state where the second body 120 is fixed to the second frame 132, force is applied that is greater than the magnetic force acting between the magnet 141 and the metallic member 142, the fixation of the second body 120 to the second frame 132 is released. The releasing makes the second body 120 rotatable with respect to the second frame 132. Therefore, the user applies force to release the fixation whenever necessary, and rotates the second body 120 with respect to the second frame 132 to adjust the tilting angle of the second body 120 with respect to the first body 110.

Alternatively, the metallic member 142 may be configured to change polarity in order to change a direction of the magnetic force according to a control command. As one example, the metallic member 142 may be an electromagnet that is changeable in polarity. When the control command is applied in a state where the second body 120 is fixed to the second frame 132, the metallic member 142 changes the polarity in order to generate a force of repulsion between the metallic member 142 and the magnet 141. Accordingly, the fixation of the second body 120 to the second frame 132 is easily released.

As another example, the metallic member 142 is configured to be rotatable, and the rotation changes a polarity of the metallic member 142 that the magnet 141 faces. That is, when the control command is applied in the state where the second body 120 is fixed to the second frame 132, the metallic member 142 rotates in such a manner that the metallic member 142 and the magnet are the same in polarity, in order to generate the force of repulsion between the metallic member 142 and the magnet 141.

In the examples described above, the control command is generated by an operation in which the user touches on a specific portion of the portable terminal 100. For example, a touch sensor for receiving the control command is provided to an upper portion of a rear surface of the portable terminal 100. When the user touches on the upper portion of a rear surface of the second body 120 to rotate the second body 120 with respect to the second frame 132, the touch sensor senses such a touch, and the controller changes the polarity of the metallic member 142 based on the touch.

Figure 6:
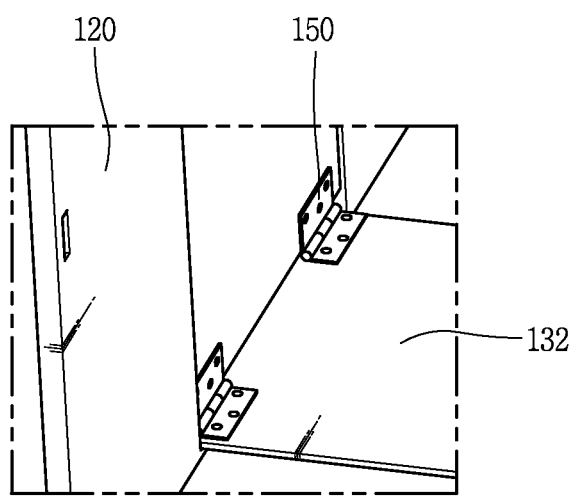
FIG. 6 is a diagram illustrating a rotation unit illustrated in FIG. 4.

FIG. 6 is a diagram illustrating a rotation unit 150 illustrated in FIG. 4. Referring to FIG. 6, as described above, with the rotation unit 150, the second frame 132 is rotatably connected to one end portion of the second body 120. The rotation unit 150, with which the second frame 132 and the second body 120 are connected to each other in a manner that rotate relative to each other, is formed in the hinge joint construction. For example, a pin may be connected to a connection portion of the second frame 132 and a connection portion of the second body 120 in such a manner that the second frame 132 and second body 120 can rotate about the pin. A separate hinge member may be connected to the connection portion of the second frame 132 and the connection portion of the second body 120 in such a manner that the second frame 132 and the second body 120 can rotate about the hinge member.

Alternatively, the second body 120 may be detachably connected to the second frame 132. In this case, the rotation unit 150 connects the second body 120 to the second frame 132 in a manner that allows rotation of the second body 120 relative to the second frame 132. For such a connection, the first body 110 and the second body 120 may be electrically connected to each other. As one example, the rotation unit 150 includes a magnet, a metallic member, and a connector. The magnet is provided to any one of the second body 120 and the second frame 132. The metallic member is provided to any one of the second body 120 and the second frame 132 and is formed to be attracted by the magnetic force of the magnet. The connector is provided to each of the second body 120 and the second frame 132. When the magnet and the metallic member are connected to each other by the magnetic force, the connectors come into contact with each other to electrically connect the first body 110 and the second body 120.

Figure 7:
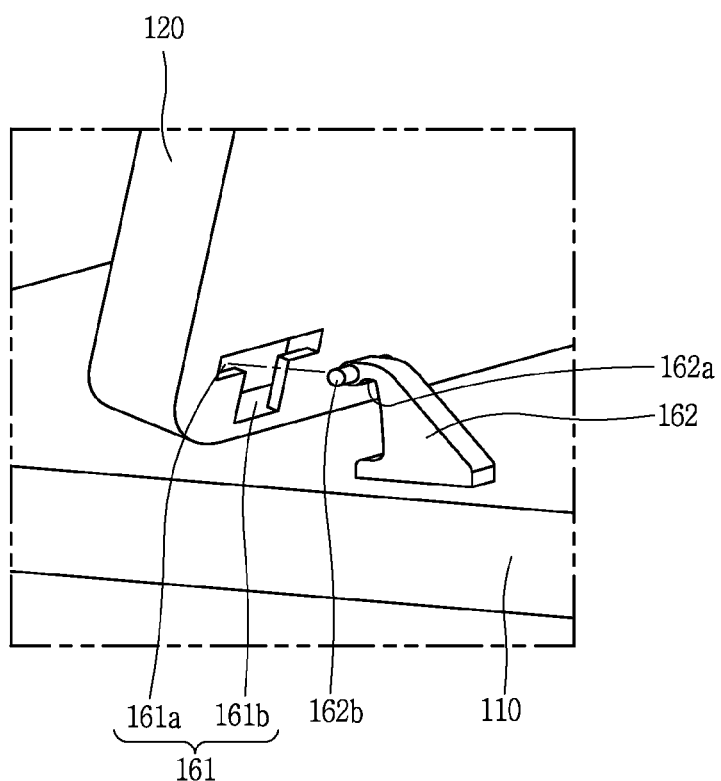
FIG. 7 is a diagram illustrating a locking portion illustrated in FIG .4.

FIG. 7 is a diagram illustrating a hook portion illustrated in FIG. 4. Referring to FIG. 7, the portable terminal 100 includes the locking portion 160. In a state where the second body 120 moves in a manner that slides with respect to the first body 110 into the tilted position, the locking portion 160 fixes one end portion of the second body 120 and smoothly rotates the second body 120 about the one end portion.

The locking portion 160 includes a locking recess 161 and a stopper 162. The locking recess 161 is formed in one end portion of the second body 120. The locking recess 161 is formed on both sides of the rear surface of the second body 120. The stopper 162 is arranged on the upper surface of the first body 110. When the second body 120 moves in a manner that slides with respect to the first body 110 into the tilted position, the stopper 162 is formed to be hook-shaped ("⌐"-shaped) in order that an end portion of the stopper 162 can be inserted into the locking recess 161. FIG. 7 illustrates that the stopper 162 is positioned in the back of the user input unit 111. As illustrated, the state where one end portion of the second body 120 is fixed by means of the stopper 162, the tilted position is more stably maintained.

A round portion 162a in a curved shape is formed on the inside of the stopper 162. The round portion 162a makes it possible for the second body 120 to smoothly rotate with respect to the second frame 132 in a state where the second body 120 is hooked onto the stopper 162.

In addition, the portable terminal 100 may additionally have the following construction in order that the second body 120 more stably rotates relative to the second frame 132.

As illustrated, a projection 162b is formed on at least one side of the stopper 162, and the locking recess 161 is configured to be T-shaped when viewed from outside.

Specifically, the locking recess 161 includes a first accommodation portion 161a and a second accommodation portion 161b. When one end portion of the second body 120 moves in a manner that slides, the first accommodation portion 161a provides a space into which the one end portion is inserted. The second accommodation portion 161b extends downward from the first accommodation portion 161a. The inside wall of the second accommodation portion 161b is formed to cover the projection 162b that is inserted inward when the second body 120 rotates relative to the second frame 132.

There is provided a configuration that when the second body 120 rotates relative to the second frame 132, with the construction described above, the stopper 162 is inserted into the second accommodation portion 161b and the projection 162b is hooked onto the inside wall of the second accommodation portion 161b. Thus, the stopper 162 is prevented from slipping out of the locking recess 161. Consequently, the second body 120 is configured to rotate relative to the second frame 132 in a more stable manner.

Another construction of the fixing portion is described below. The features of the portable terminal 100 described above is applicable to the portable terminal 200 described below in the same or similar manner with the exception of the construction of the fixing portion.

Figure 8:
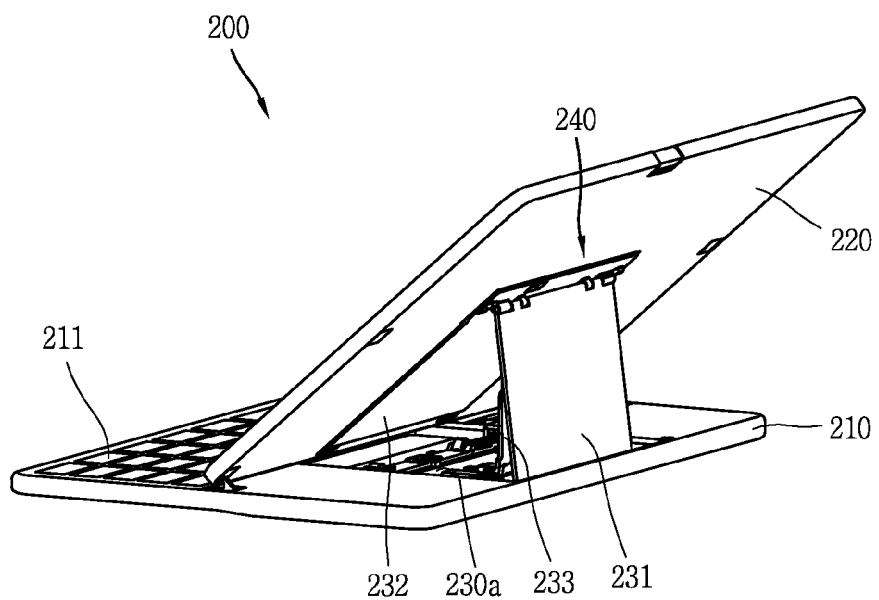
FIG. 8 is a diagram illustrating a portable terminal according to another embodiment of the present invention.
Figure 9:
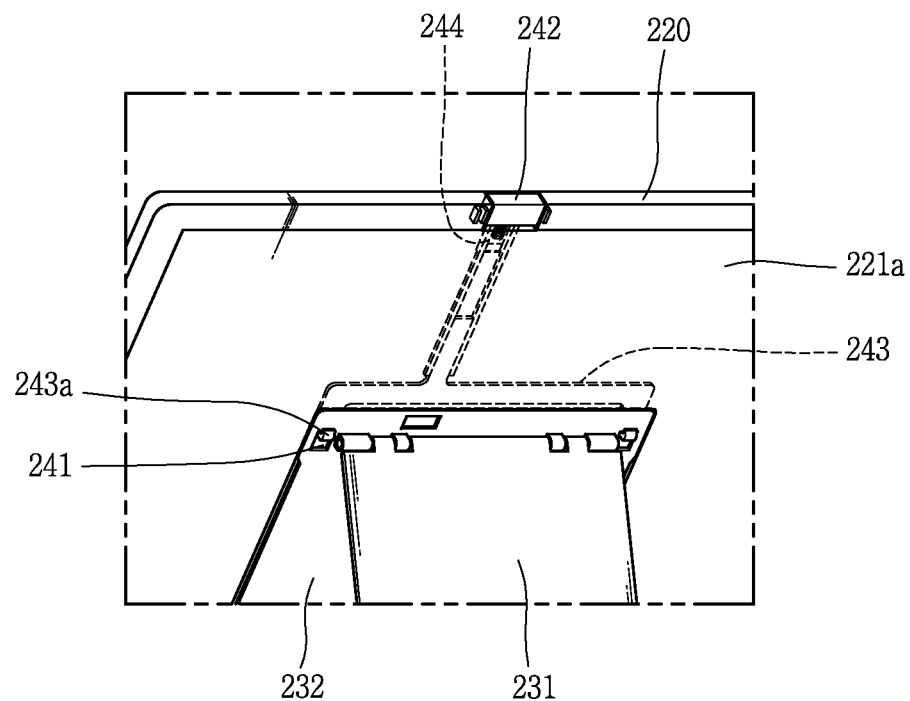
FIG. 9 is a diagram illustrating a fixing portion illustrated in FIG. 8.

FIG. 8 is a diagram illustrating a portable terminal 200 according to another embodiment of the present invention. FIG. 9 is a diagram illustrating a fixing portion 240 illustrated in FIG. 8. Referring to FIGS. 8 and 9, the fixing portion 240 is configured to fix a second body 220 to a second frame 232 using a hooking construction, and includes a locking hole 241, a manipulating member 242, and a moving member 243.

The locking hole 241 is formed in the second frame 232. The locking hole 241 may be provided at both sides of the second body 232.

The manipulating member 242 is installed in the second body 220 in such a manner that the pushing-down operation can be performed on the manipulating member 242. FIGS. 8 and 9 illustrates that the manipulating member 242 is installed in the center of an upper portion of the second body 220 and extends toward a lower portion of the second body 220 in such a manner that the pushing-down operation can be performed on the manipulating member 242.

The moving member 243 is configured to be movable by the pushing-down operation of the operating unit 242 and includes a locking hook 243a that, due to the moving of the moving member 243, is detachably engaged with locking hole 241. That is, when the locking hook 243a is engaged with the locking hole 241, the second body 220 stays fixed to the second frame 232. When the engaging of the locking hook 243a with the locking hole 241 is released by performing the pushing-down operation of the manipulating member 242, the second body 220 becomes rotatable with respect to the second frame 232.

The fixing portion 240 further includes an elastic member 244. The elastic member 244 provides an elastic force to the manipulating member 242 in order that the moving member 243 that is moved by performing the pushing-down operation of the manipulating member 242 can return to its original state. FIGS. 8 and 9 illustrate a configuration in which the elastic member 244 is arranged between the second body 220 and the manipulating member 242 to apply pressure to the manipulating member 242.

As an alternative approach, the moving member 243 may be arranged on a rear surface of a display unit 221a. Thus, the moving member 243 is configured to move on the rear surface of the display unit 221a in a sliding manner when performing the pushing-down operation of the manipulating member 242.

Figure 10:
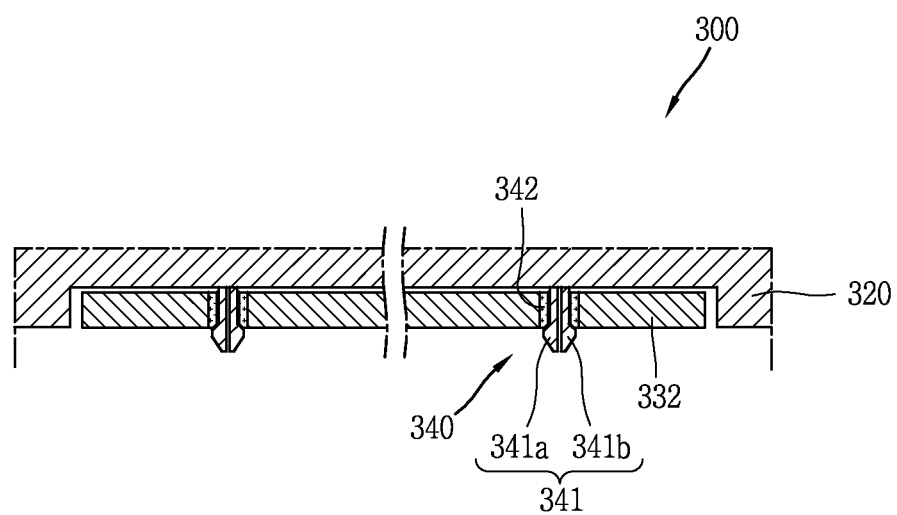
FIGS. 10 and 11 are diagrams illustrating portable terminals according to embodiments of the present invention, respectively.
Figure 11:
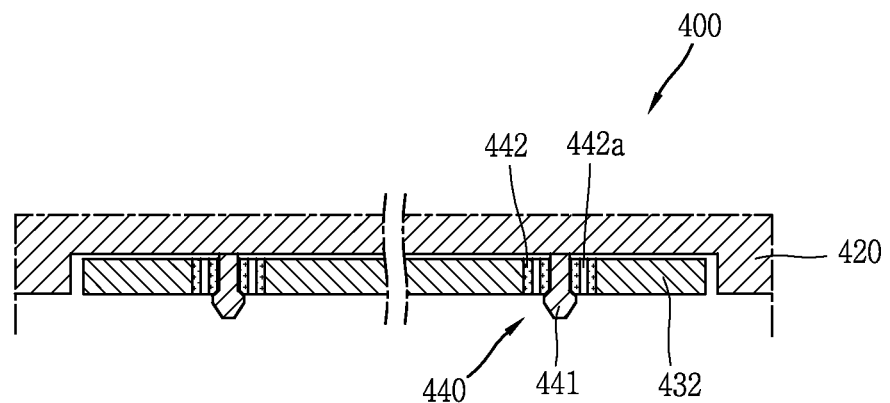

FIGS. 10 and 11 are diagrams illustrating portable terminals 300 and 400 according to embodiments of the present invention, respectively. Referring to FIGS. 10 and 11, fixing portions 340 and 440 are configured to fix second bodies 320 and 420 to second frame 341 and 441, respectively, using an insertion construction, and includes projections 341 and 441 and elastic members 342 and 442, respectively.

Specifically, the projections 341 and 441 are provided to one of the second bodies 320 and 420 and second frames 332 and 432, respectively. According to the present embodiments, the projections 341 and 441 are formed on rear surfaces of the second bodies 320 and 420. End portions of the projections are formed to protrude toward the circumference, in order for the projections 341 and 441 to be inserted into and be hooked onto holes in the elastic members 342 and 442, respectively.

The elastic members 342 and 442, into which the projections 341 and 441 are detachably inserted, respectively, are provided to the other of the second bodies 320 and 420 and the second frames 332 and 432, respectively. The elastic members 342 and 442 have central holes into which the projections 341 and 441 are inserted, respectively. The elastic members 342 and 442 are made of elastic material in such a manner that shapes of the central holes are changed when the projections 341 and 441 are inserted into the central holes, respectively.

FIG. 10 illustrates that the projection 341 is configured from multiple pieces 341a and 342b in such a manner that when the projection 341 is inserted into and removed from the central hole in the elastic member 342, the shape of the projection 341 is elastically changed. Alternatively, FIG. 11 illustrates that the elastic member 442 has a ring 442a around the circumference of the central hole in such a manner that when the projection 441 is inserted into the central hole in the elastic member 442, a size of the central hole can be increased due to the flexing of the elastic member 442.

Figure 12:
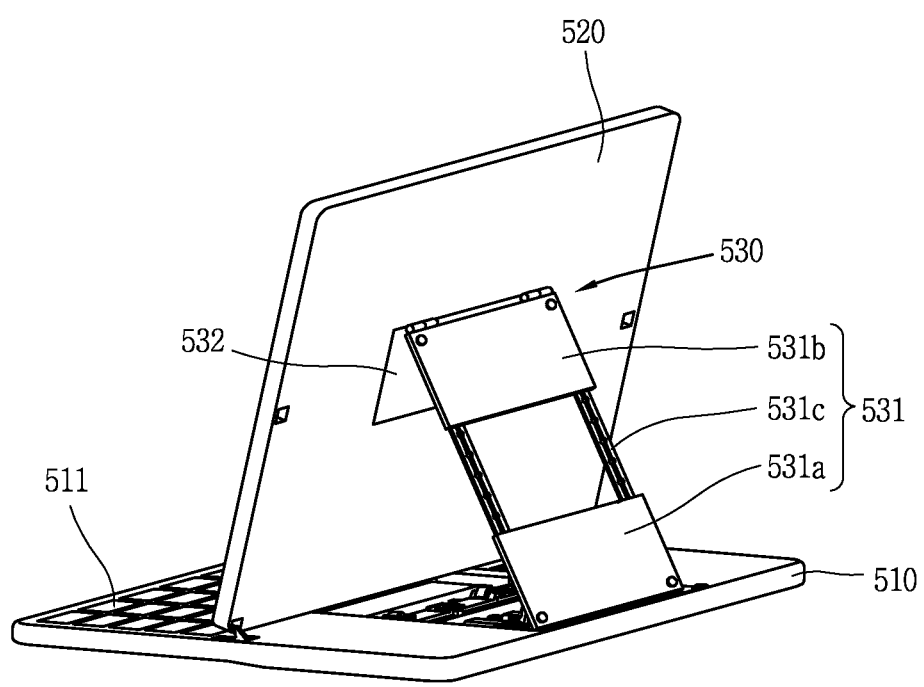
FIG. 12 is a diagram illustrating a portable terminal according to another embodiment of the present invention.
Figure 13:
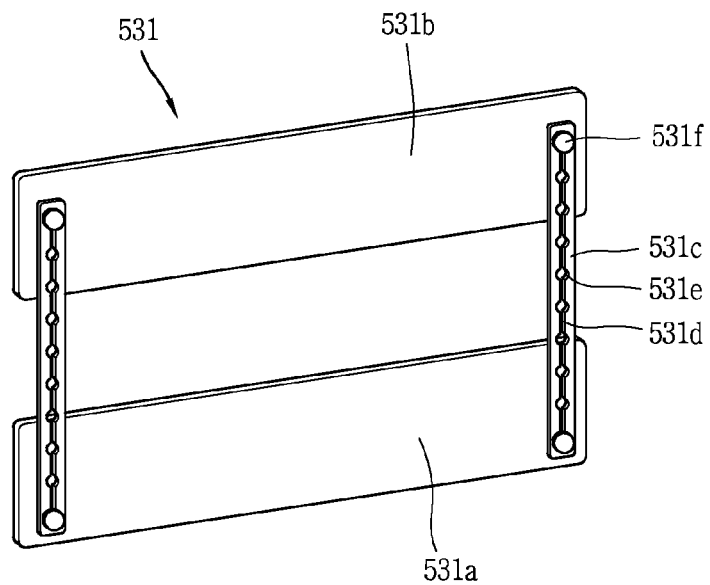
FIG. 13 is a diagram illustrating a first frame illustrated in FIG. 12.

A construction in which the tilting angle of the second body with respect to the first body is adjusted in a different manner is described below. FIG. 12 is a diagram illustrating a portable terminal 500 according to another embodiment of the present invention. FIG. 13 is a diagram illustrating a first frame 531 illustrated in FIG. 12. Referring to FIGS. 12 and 13, a hinge module 530 includes a first frame 531 and a second frame 532.

A construction according to the present embodiment is the same as or is similar to the construction described above, in terms of the configuration in which the first frame 531 is rotatably connected to the first body 510, the second frame 532 is rotatably connected to the first frame 531, and, when the second body 520 moves relative to the first body 510, the second body 520 is supported.

However, according to the present invention, a length of the first frame 531 is configured to be changeable in such a manner that in a state where the second body 520 moves in a manner that slides with respect to the first body 510 into the tilted position, an angle of the second body 520 with respect to the first body 510 can be adjusted. To do this, the first frame 531 includes a stationary member 531a, a moving member 531b, a guide rail 531c, and a guide member 531f. The stationary member being rotatably fixed to the first body 510 while the moving member is entirely displaceable from the first body 520. The moving member 53 1b moves relative to the stationary member 531a based on the cooperation of the guide 531c and the guide member 531f.

There is provided a configuration in which the stationary member 531a is rotatably connected to the first body 510 and the moving member 531b can move away from or close to the stationary member 531a. In addition, the moving member 531b is rotatably combined with the second frame 532.

The guide rail 531c is installed in the stationary member 531a and extends along a direction in which the moving member 53 1b moves relatively. According to the present embodiment, the guide rail 531c is provided to the left and right sides of the stationary member 53 1a in order for the moving member 53 1b to move in a stable manner.

The guide member 531f is installed in the moving member 53 1b, and is combined with the guide rail 531c to guide the relative movement of the moving member 53 1b. According to the present embodiment, the guide member 531f is movably inserted into a guide hole 531d formed in the guide rail 531c and thus the guide member 531f guides the movement of the moving member 531b.

One or more hooking portions 531e onto which the guide member 531d can be hooked is provided to the guide hole 531d. The hooking portions 531e are at every predetermined distances within the guide hole 531d in such a manner that the second body 520 changes in position by predetermined tilting angles with respect to the first body 510.

With the construction described above, the user can adjust the tilting angle of the second body 520 by pulling an upper portion of the second body 520. The adjustment is made not only in the state where the second body 520 moves in a manner that slides with respect to the first body 510 into the tilted position, but also in a state where the second body is arranged to cover the first body 510.

According to another embodiment of the present invention, in the state where the second body is arranged to cover the first body in an overlapping manner, the relative rotation of the first frame with respect to the first body can be limited. A construction for realizing this embodiment is described below.

Figure 14:
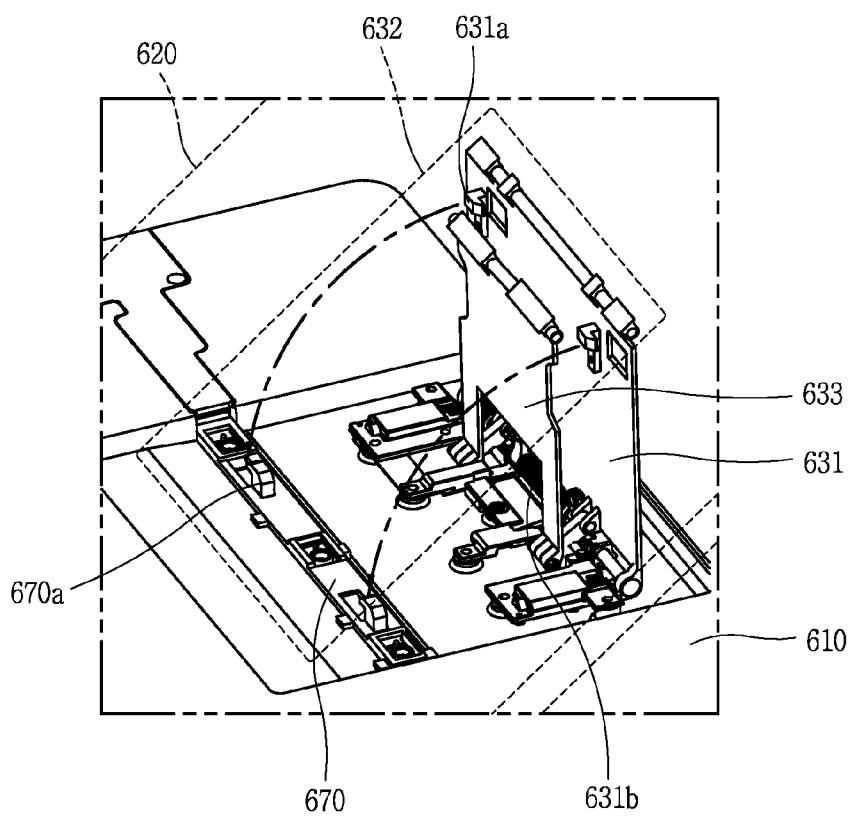
FIGS. 14, 15A and 15B are diagrams for describing a locking construction involving a first frame and a latch bar in a portable terminal according to another embodiment of the present invention.
Figure 15A:
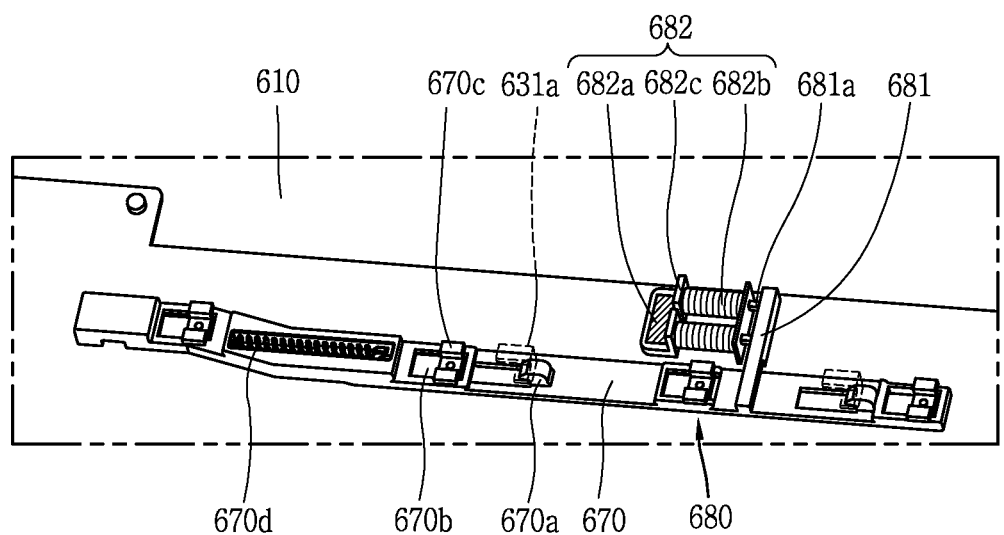
Figure 15B:
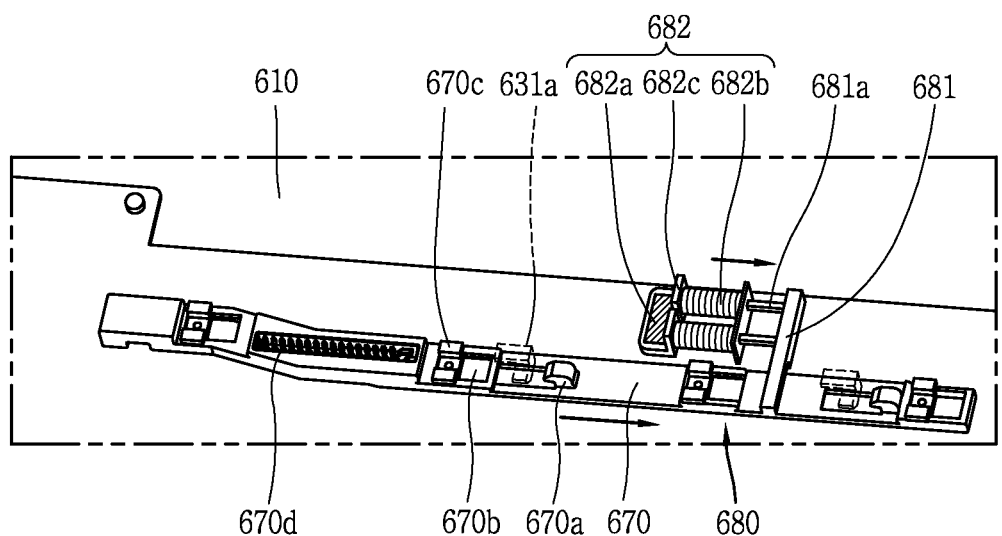
Figure 16:
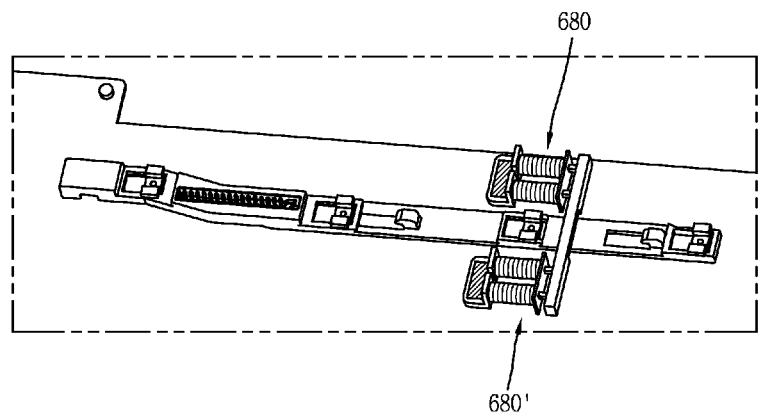
FIGS. 16, 17A, 17B, 18A, 18B, and 19 are diagrams illustrating modification examples of a locking construction in FIG. 14.

FIGS. 14, 15A and 15B are diagrams for describing a locking construction involving a first frame 631 and a latch bar 670 in a portable terminal according to another embodiment of the present invention. According to FIGS. 14, 15A and 15B, a first hook 631a is provided to the first frame 631. When the first frame 631 rotates to cover a first body 610, the first hook 631a moves toward a second hook 670a that is provided at a latch bar 670.

The latch bar 670 is installed in the first body 610 in such a manner that the latch bar 670 is movable in a first direction and a second direction that are opposite to each other. The latch bar 670 includes the second hook 670a that is configured in such a manner that the second hook 670 can be hooked onto the first hook 631a in order to fix the first frame 631 to the first body 610. For convenience in description, one portion of the latch bar 670 is exposed in FIGS. 14, 15A and 15B, but there is provided a configuration in which only one portion of the latch bar 670, including the second hook 670a, is exposed to the outside, and the rest of portions of the latch bar 670 are accommodated within the first body 610 in order not to be exposed to the outside.

FIG. 15A illustrates a state in which the first hook 631a is hooked onto the second hook and thus the rotation of the first frame 631 is limited. FIG. 15B illustrates a state where the hooking of the first hook 631a onto the second hook 670a is released and thus the first frame 631 stays rotatable.

When the second body 620 moves to cover the first body 610, the first frame 631 connected to the first body 610 also rotates relatively to cover the first body 610. When the second body 620 is arranged to entirely cover the first body 610, the first hook 631a is hooked onto the second hook 670a, and thus the first frame 631 and the second body 620 connected to the first frame 631 to limit rotation.

There is provided a configuration in which in this process, the first hook 631a moves along an inclined surface of the second hook 670a in a sliding manner and, when passing the inclined surface, is hooked onto the inside of the second hook 670a. When the first hook 631a moves along the inclined surface in a sliding manner, the latch bar 670 moves somewhat in a first direction in which the hooking of the first hook 631a onto the second hook 670a is released, but as described below, moves in a second direction due to the elastic force and returns to its original position.

There is provided a configuration in which when in the state where the second body 620 is arranged to cover the first body 610 in an overlapping manner and thus the first hook 631a is hooked onto the second hook 670a, the control command is applied, the latch bar 670 moves in the first direction and thus the hooking of the first hook 631a onto the second hook 670a is released. As a result, the first frame 631 and the second body 620 connected to the first frame 631 stay movable relative to the first body 610.

When the latch bar 670 moves in the first direction and thus the hooking of the first hook 631a onto the second hook 670a is released, the first frame 631 rotates relative to the first body 610 by means of a torsion spring 631b. Thereafter, according to the mechanism described above, the second body 620 moves in a manner that slides with respect to the first body 610 into the tilted position.

A construction that realizes locking involving the latch bar 670 and the first frame 631 and releasing the locking is described in more detail below.

There is provided a configuration in which the latch bar 670 is installed to the first body 610 in such a manner that the latch bar 670 is movable in the first and second directions, and thus when the latch bar 670 moves in the first direction, the locking is released. That is, in a state where the first frame 631 is locked in the latch bar 670, the first hook 631a is hooked onto the second hook 670a, and in a state where the locking is released, the hooking of the first hook 631 a onto the second hook 670a is released.

As illustrated in FIG. 15A, a locking unit 680 is provided to the first body 610 and the latch bar 670. The locking unit 680 moves the latch bar 670 using an electromagnetic force. There is provided a configuration in which the locking unit 680 connects the first body 610 and the latch bar 670 in the locking state using the magnetic force. When switching to a locking-releasing state, the locking unit 680 causes the magnetic force to be overwhelmed by the electromagnetic force. That is, the latch bar 670 is configured to be movable in the first and second directions using the magnetic force and the electromagnetic force.

The locking unit 680 includes a first locking member 681 and a second locking member 682 that are configured in such a manner that the first locking member 681 and the second locking member 682 can be connected to or separated from each other.

The first locking member 681 is installed in the latch bar 670, and includes a pin 681a made of metal material that is responsive to the magnetic force. FIG. 15B illustrates that the multiple pins 681a are formed to protrude in a lengthwise direction of the latch bar 670.

The second locking member 682 is installed in the first body 610. The second locking member 682 includes a magnet 682a that exerts the magnetic force that attracts the pin 681 and a solenoid coil 682b that exerts the electromagnetic force that repulses the pins 681a when electric current is applied. That is, the magnet 682a exerts a force of attraction to the pin 681a and, when electric current is applied to the solenoid coil 682b, a force of repulsion is applied to the pin 681a.

The second locking member 682 further includes a bobbin 682c that includes an accommodation portion within which at least one portion of the pin 681a is accommodated in the locking state. As illustrated, the solenoid coil 682b is wound around the circumference of the accommodation portion, and the magnet 682a is mounted on the bobbin 682c.

In addition, an elastic member 670d that applies pressure to the latch bar 670 in the second direction is connected to each of the first body 610 and the latch bar 670. The elastic member 670d is configured in such a manner that after releasing the locking, the latch bar 670 moves in the second direction, that is, in a direction in which the first locking member 681 and the second locking member 682 approaches each other.

A guide hole 670b, which extends along a direction in which the latch bar 670 moves, is provided to the latch bar 670. A guide member 670c is provided to the first body 610. The guide member 670c is inserted into the guide hole 670b to guide the movement of the latch bar 670.

As described above, with the construction described above, the first hook 63 la stays hooked onto the second hook 670a in a state where the force of attraction due to the magnet 682a and the elastic force due to the elastic member 670d are applied to the pin 681a and thus the pin 681a is accommodated within the accommodation portion. Therefore, the first frame 631 is locked in the latch bar 670 and is limited in rotation.

As illustrated in FIG. 15B, when electric current flows through the solenoid coil 682a, the electromagnetic force is generated that is greater than a sum of the force of attraction due to the magnet 682a and the elastic force due to the elastic member 670d. Accordingly, the pin 681a is withdrawn from the accommodation portion and moves in the first direction. As a result, the hooking of the first hook 631a onto the second hook 670a is released and thus the locking of the first frame 631 is released.

Electric current is prevented from flowing through the solenoid coil 682b in order that after the locking of the first frame 631 is released, the pin 681a can be accommodated back within the accommodation portion due to the magnetic force. When electric current is prevented from flowing through the solenoid coil 682a, the force of attraction that is exerted between the pin 681a and the magnet 682a and the elastic force due to the elastic member 670d are applied to the latch bar 670 and thus the latch bar 670 moves in the second direction. Therefore, the latch bar 670 moves back in the second direction immediately after moving in the first direction, in order to release the hooking of the first hook 63 la onto the second hook 670a.

Thereafter, when the second body is arranged to cover the first body 610, the first hook 631a moves along the inclined surface of the second hook 670a in a sliding manner and, when passing the inclined surface, is hooked onto the inside of the second hook 670a. While the first hook 631a moves along the inclined surface of the second hook 670a in a sliding manner, the latch bar 670 moves somewhat in the first direction, but when the first hook 631a moves over the inclined surface and is hooked onto the second hook 670a, moves back in the second direction due to the force of attraction between the pin 681a and the magnet 682a and the elastic force of the elastic member 670d.

As an alternative to the foregoing, the command for moving the latch bar 670 can be applied in various forms. As one example, a manipulation unit for inputting the control command or an authentication unit for generating the control command through user authentication may be provided to a portable terminal 600.

For example, the manipulation unit includes a touch sensor that senses a predetermined touch input. When the touch sensor provided to the second body 620 senses a drag touch that is dragged from one direction to another direction, the controller controls electric power that flows through the solenoid coil 682b in order to generate the electromagnetic force.

FIGS. 16, 17A, 17B, 18A, 18B, and 19 are diagrams illustrating modification examples of the locking construction in FIG. 14. As one example, referring to FIG. 16, two or more locking units 680 and 680' are provided in order to apply uniform force to the latch bar 670. For example, two second locking members 682, each including a magnet 682*a* and a solenoid coil 682*b*, are provided with the latch bar 670 located in between the two second locking members 682.

Figure 17A:
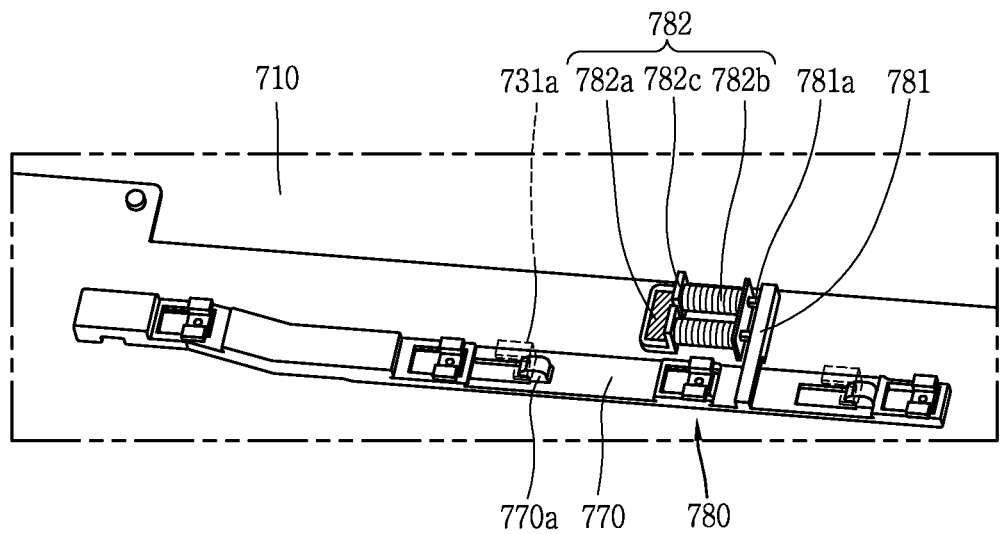
Figure 17B:
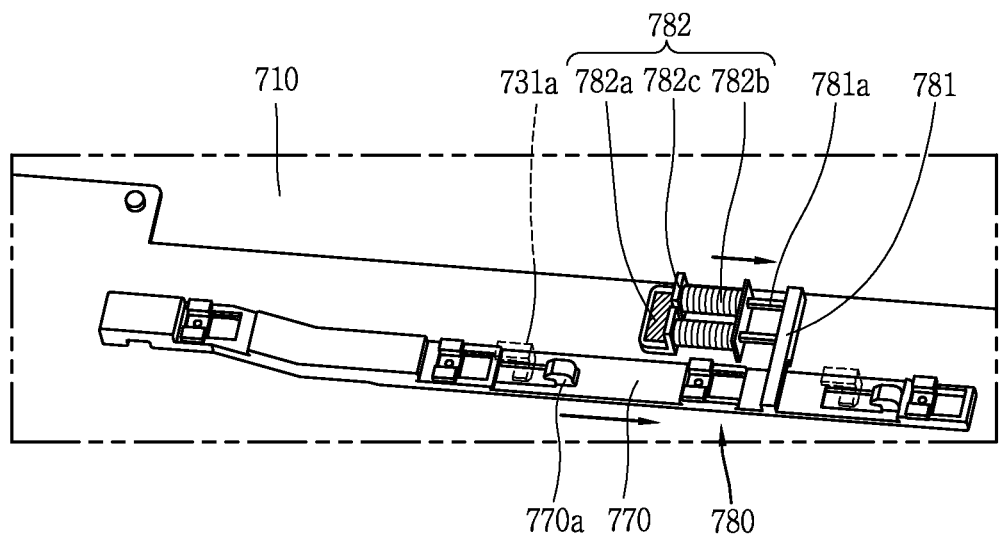

As another example, referring to FIGS. 17A and 17B, the locking portion 780 is configured in such a manner that the locking portion 780 is movable in the first and second directions due to the magnetic force of the magnet 782*a* and the electromagnetic force of the solenoid coil 782*b* on the bobbin 782*c*. That is, in the previous example, the latch bar 670 is pushed forward and then returns to its initial position by means of the elastic member 674, but in the present example, a latch bar 770 returns to its initial position due to the magnet force of the magnet.

Additionally, while a first hook 731*a* moves along an inclined surface of a second hook 770*a* in a sliding manner, a latch bar 770 moves somewhat in the first direction, but when the first hook 731*a* moves over the inclined surface and is hooked onto the second hook 770*a*, moves back in the second direction due to the force of attraction between a pin 781*a* and a magnet 782*a*.

Figure 18A:
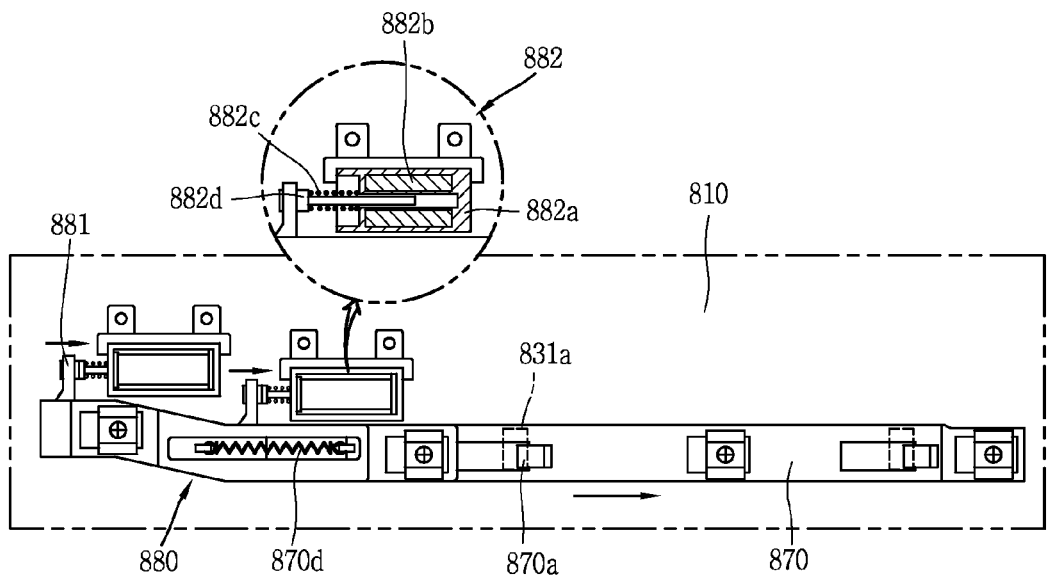
Figure 18B:
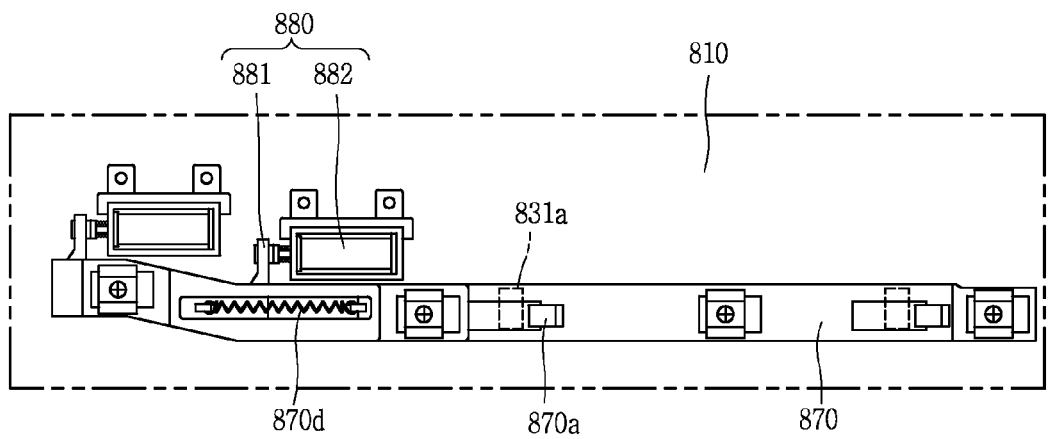

As another example, referring to FIGS. 18A and 18B, locking unit 880, which moves a latch bar 870 using a connection portion 881 and a solenoid unit 882, is provided to a first body 810.

As illustrated, the solenoid unit 882 includes a body 882*a*, a solenoid coil 882*b*, an elastic member 882*c*, and a pin 882*d*. Specifically, the solenoid coil 882*b* is installed within the body 882*a* in such a manner that the solenoid 882*b* encloses the pin 882*d* accommodated within the body 882*a*. One portion of the pin 882*d* is accommodated within the body 882*a*, and another portion of the pin 882*d* protrudes from one surface of the body 882*a*. The elastic member 882*c* applies the elastic force to the pin 882*d* in order for the pin 882*d* to protrude from the body 882*a*, and the solenoid coil 882*b* to which electric current is applied applies the electromagnetic force to the pin 882*d* in order for the pin 882*d* to be inserted into the body 882*a*. In this manner, the pin 882*d* protrudes from or is inserted into the body 882*a* due to the elastic force of the elastic member 882*c* and the electromagnetic force of the solenoid coil 882*b*.

The connection portion 881 is connected to the latch bar 870 and is configured to move the latch bar 870 depending on whether the pin 882*d* protrudes or is inserted. Specifically, the mechanism is described as being based on a configuration in which when in a state where a second body 820 is arranged to cover the first body 810 in an overlapping manner and thus a first hook 831*a* is hooked onto a second hook 870*a*, the control command is applied, the electromagnetic force generated by electric current flowing through the solenoid coil 882*b* is applied to the pin 882*d*. Thus the pin 882*d* is inserted into the body 882*a* and the latch bar 870 moves in the first direction, thus hooking of the first hook 831*a* onto the second hook 870*a* is released. Thereafter, according to the mechanism described above, the second body 820 moves in a manner that slides with respect to the first body 810 into the tilted position.

After the latch 870 is pushed forward, electric current is prevented from flowing through the solenoid coil 882*b*, and the pin 882*d* protrudes from the body 882*d* due to the elastic force of the elastic member 882*c*. Accordingly, the latch bar 870 returns to its initial position. As illustrated, an elastic member 870*d* is connected to the first body 810 and the latch bar 870 in order for the latch bar 870 to return to its initial position. Two or more of the locking units 880 may be provided to exert much greater force to the latch bar 870.

Figure 19:
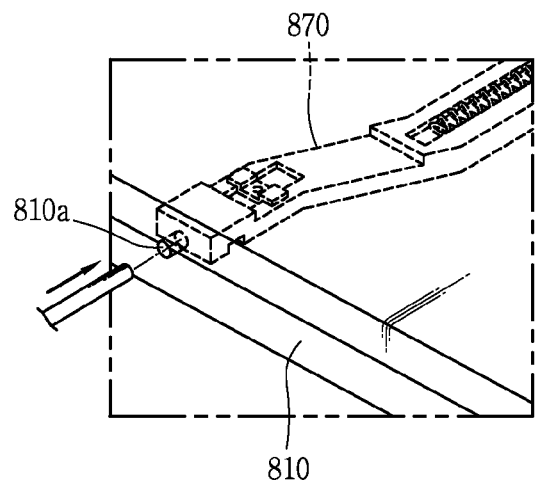

Referring to FIG. 19, a hole 810*a* that communicates with the latch bar 870 may be formed in the first body 810. The hole 810*a* is formed in a portion that faces one end portion of the latch bar 870, in such a manner that a pressure-applying member (for example, a clip, a pin, or the like) is inserted into the hole 810*a* and thus pushes the latch bar 870 in a direction in which the hooking of the first hook 831*a* onto the second hook 870*a* is released. It is understood that the construction is for forcing the latch 870 to be pushed forward to release the hooking of the first hook 831*a* onto the second hook 870*a* when the solenoid unit 882 does not normally operate.

Figure 20:
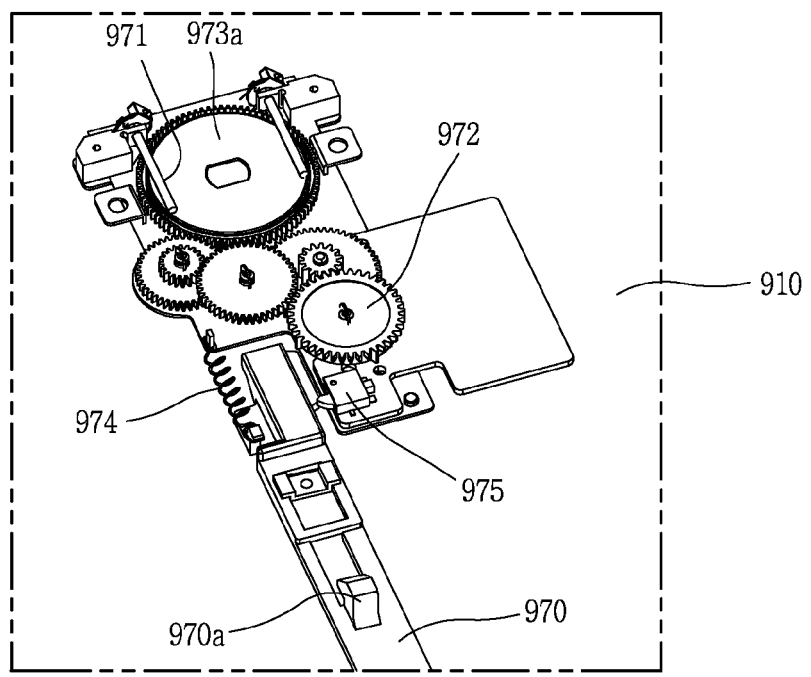
FIG. 20 is a diagram illustrating another example of the locking construction that involves a first frame and a latch bar and that uses a motor.

FIG. 20 is a diagram illustrating another example of the locking construction that involves a first frame 931 and a latch bar 970 and that uses a motor 971. Referring to FIG. 20, the motor 971 is configured in such a manner that when the control command is applied, the motor 971 generates a driving force. For example, the motor 971 may be a linear motor that generates a linear driving force.

The motor 971 provides the driving force to a pinion gear 972 and thus the pinion gear 872 rotates to move the latch bar 970. Teeth are formed at regular intervals along the circumference of one side of the pinion gear 972 and are configured in such a manner that when the pinion gear 972 rotates, the teeth apply pressure to the latch bar 970 and thus the latch bar 970 is pushed forward. At least one gear 973 that transfers the driving force may be provided between the motor 971 and the pinion gear 972.

When the latch bar 970 is pushed forward, the hooking of a first hook onto a second hook 970*a* is released and thus a first hook and a second body connected to the first frame becomes movable relative to a first body 910. The latch bar 970 is pushed forward and then returns to its initial position by means of an elastic member 974. The elastic member 974, for example, is a spring that is installed in each of the first body 910 and the latch bar 970.

On the other hand, while the latch bar 970 is pushed forward, the latch bar 970 comes into contact with a limit switch 975. When the latch bar 970 comes into contact with the limit switch 975, the limit switch 975 transfers a driving-stopping signal to the controller in order to stop driving the motor 971.

The construction described above is thought of as a semi-automatic mechanism as the releasing of the locking is automatically realized while, in order to engaging the locking, the user has to arrange the second body 920 in a manner that overlaps the first body 910 by applying pressure to the second body 920 in order to hook the first hook onto the second hook 970*a*.

Figure 21:
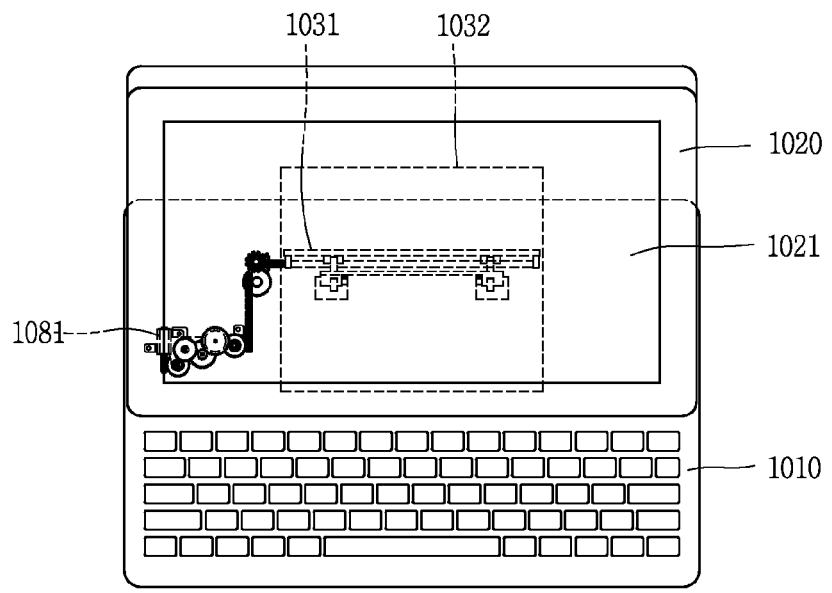
FIG. 21 is a diagram illustrating a portable terminal according to another embodiment of the present invention.
Figure 22:
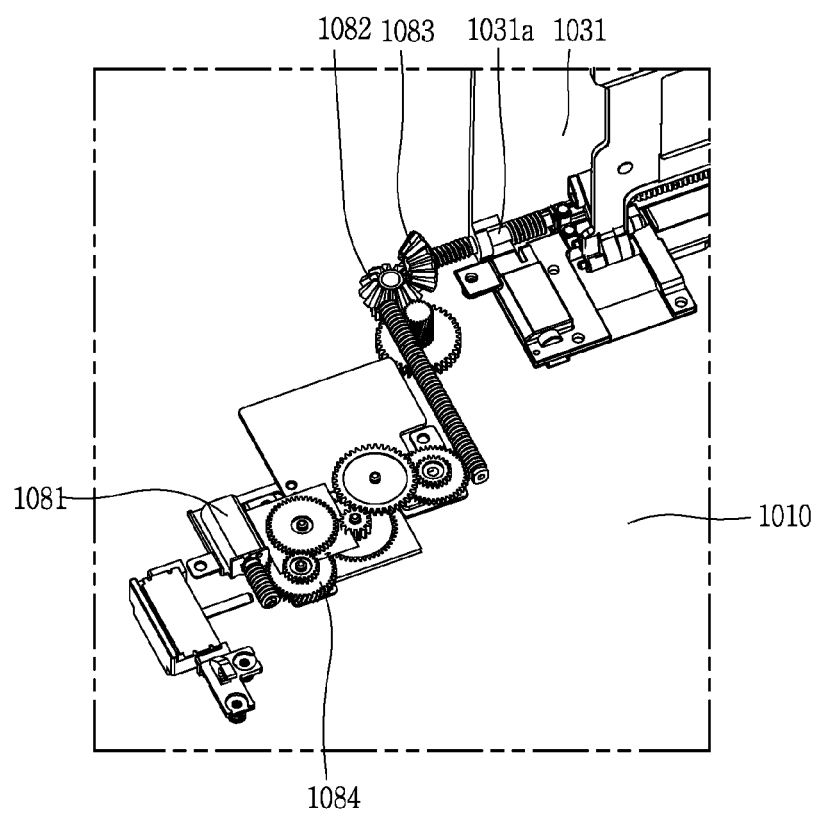
FIG. 22 is a diagram in detail illustrating a driving mechanism illustrated in FIG. 21.

A portable terminal is described below in which relative movement of the second body with respect to the first body is automatically realized. FIG. 21 is a diagram illustrating a portable terminal 1000 according to another embodiment of the present invention. FIG. 22 is a diagram in more detail illustrating a driving mechanism illustrated in FIG. 21.

Referring to FIGS. 21 and 22, a motor 1081 that performs driving in response to the control command is installed in a first body 1010. The control command is input through various input units. For example, a manipulation unit for inputting the control command, or an authentication unit for generating the control command through the user authentication may be provided to the portable terminal 1000.

The manipulation unit is configured to include a mechanical key for inputting the control command by a pushing-down operation or a touch sensor that senses a touch input. In addition, the authentication unit, for example, is configured to include a voice recognition sensor that senses the user through audio that is input, or an iris recognition sensor that recognizes the user through a user's iris.

The controller is configured to drive a motor 1081 when the control command is input. When the motor 1081 is driven, a first gear 1082 that is connected to the motor 1081 rotates. At least one gear 1084 is further provided between the first gear 1082 and the motor 1081 to adjust a speed, torque, or the like.

A rotation shaft 1031a is fixed to a first frame 1031, and is configured in such a manner that when the rotation shaft 1031a rotates, the first frame 1031 rotates together. A second gear 1083 that is engaged with the first gear 1082 is connected to the rotation shaft 1031a. FIG. 22 illustrates that the first and second gears 1082 and 1083 are configured as bevel gears.

When the motor 1081 is driven according to this cooperative operation relation, the first frame 1031 rotates relative to the first body 1010. When in a state where a second body 1020 is arranged in a manner that overlaps the first body 1010, the first frame 1031 rotates by the mechanism described above, the second frame 1032 rotates relative to the first frame 1031 as well. The second body 1020 connected to the second frame 1032 rotates while moving in a manner that slides with respect to the first body 1010 and thus is arranged at a predetermined angle. When in this state, the motor is driven in the opposite direction, the second body 1020 switches to the state where the second body 1020 is arranged to cover the first body 1010 back in an overlapping manner. That is, a direction in which the first frame 1031 rotates varies with a direction in which the motor 1081 is driven. Therefore, the relative movement of the second body 1020 with respect to the first body 1010 is automatically realized.

Figure 23:
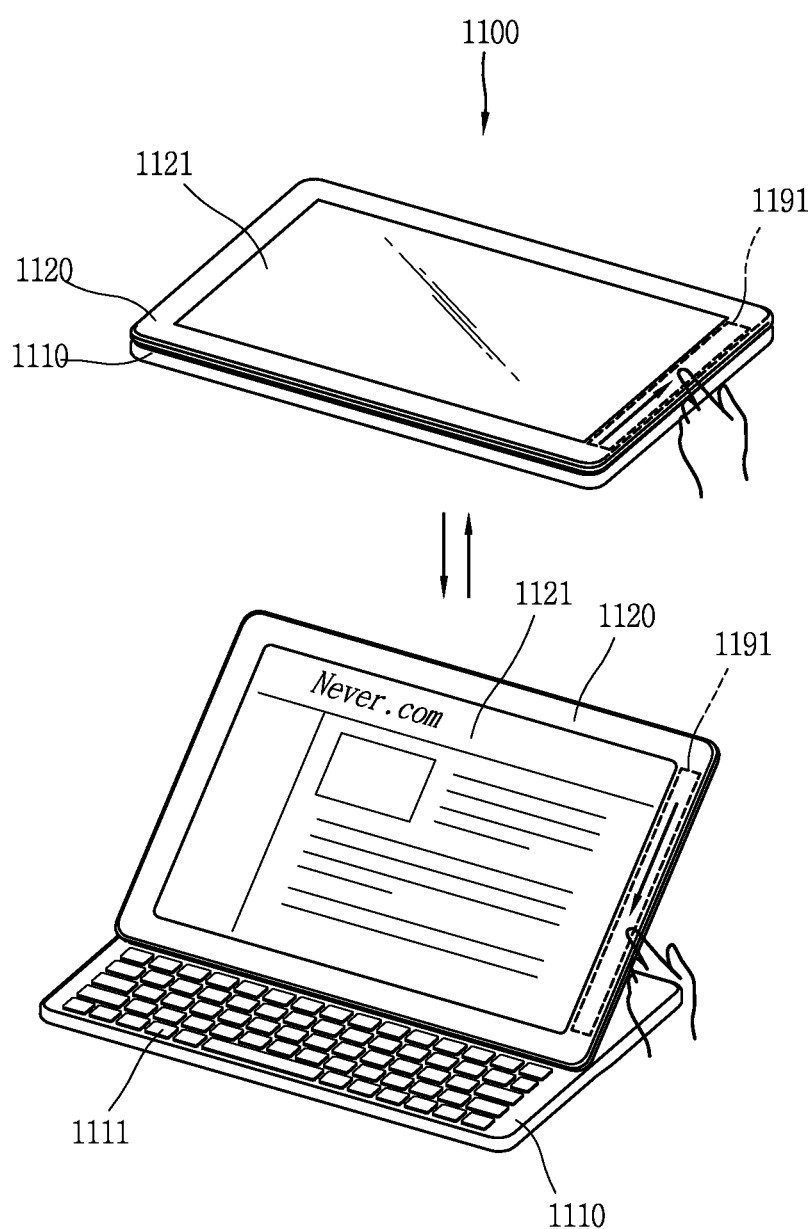
FIGS. 23 to 25 are diagrams illustrating a second body that moves relative to a first body in response to a control command.
Figure 24:
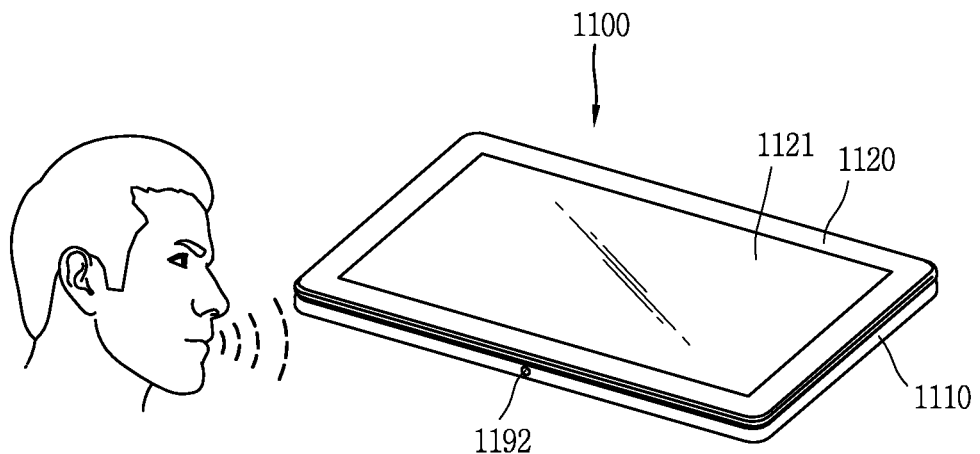
Figure 25:
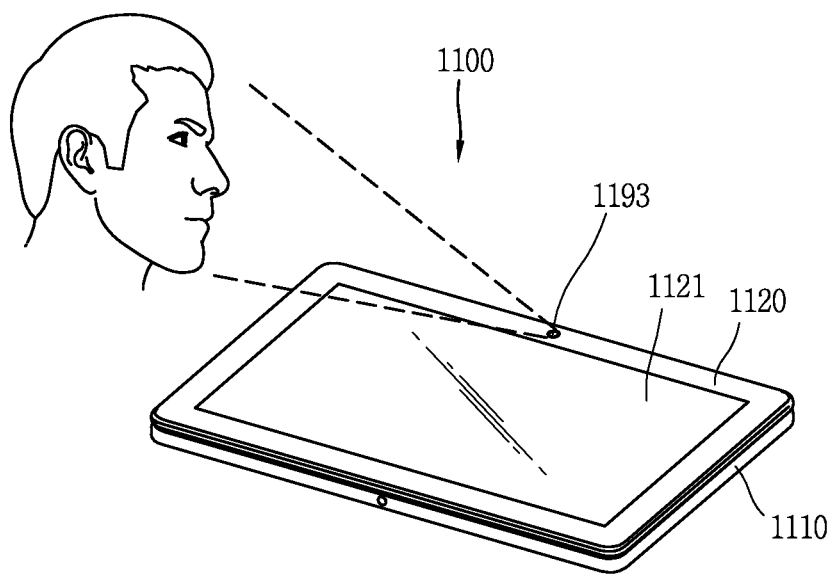

FIGS. 23 to 25 are diagrams illustrating a second body 1120 that moves relative to a first body 1110 in response to a control command. The commands described above (the control command for applying electric current to the solenoid coils 682b, 782b, and 882b, the control command for driving the motors 971 and 1081, and the like) are input through at least one among the input units described below. As the input unit, a manipulation unit for inputting the control command or an authentication unit for generating the control command through the user authentication may be provided to a portable terminal 1100. The manipulation unit is configured to include a mechanical key for inputting the control command by a pushing-down operation or a touch sensor that senses a touch input.

FIG. 23 illustrates that the second body 1120 moves relative to the first body 1110 in response to the touch input that is sensed by a touch sensor 1191. As illustrated, the touch sensor 1191 that senses the touch input is provided to the first or second body 1110 or 1120.

When in a state where the second body 1120 is arranged in a manner that overlaps the first body 1110, a predetermined touch input is applied to the touch sensor 1191, the controller recognizes this as the control command associated with the relative movement of the second body 1120. The predetermined touch inputs include a drag touch that starts with the touch on one point and ends with the touch on another point, a double tap in which the touch is successively applied, a multi-touch in which the touch is applied to at least two points, and the like.

When the predetermined touch input is applied, the controller applies electric current to the solenoid coil (692b, 782b, or 882b) in order to generate the electromagnetic force, or drives the motor 971 in order to move the latch bar 970 in the direction in which the hooking of the first hook 931a onto the second hook 970a is released, or drive the motor 1081 in order to rotate the rotation shaft 1031a by which the first frame 1031 rotates relative to the first body 1010.

The controller divides the touch input to the touch sensor into a first touch input and a second touch input and recognizes these first and second inputs as different control commands.

For example, according to the embodiments associated with FIGS. 21 and 22, when in the state where the second body 1020 is arranged in a manner that overlaps the first body 1010, the touch sensor 1191 senses the drag touch in the first direction, the rotation shaft 1031a rotates in one direction in such a manner that the second body 1020 moves in a manner that slides with respect to the first body 1010 into the tilted position. In addition, when in the state where the second body 1020 moves in a manner that slides with respect to the first body 1010 into the tilted position, the touch sensor 1191 senses the drag touch in the second direction, the rotation shaft 1031a rotates in another direction in such a manner that the second body 1020 is arranged in a manner that overlaps the first body 1010.

According to another embodiment, as shown in FIG. 23, a display unit 1121 is provided to the second body 1120. When in a state where the second body 1120 is arranged to cover the first body 1110, the display unit 1121 is inactive (OFF), the control command is applied, the second body 1120 moves in a manner that slides with respect to the first body 1110 and thus switches to a tilted state, and the display unit 1121 switches to an active state (ON).

In addition, the authentication unit, for example, is configured to include a voice recognition sensor that senses the user through audio that is input, or an iris recognition sensor that recognizes the user through a user's iris. Referring to FIGS. 24 and 25, the portable terminal 1100 includes a voice recognition module 1192 that includes a voice recognition sensor, or an iris recognition module 1193 that includes an iris recognition sensor. When the user is authenticated as a predetermined user through the voice recognition module 1192 or the iris recognition module 1193, the controller recognizes this as the control command associated with the relative movement of the second body 1120.

When in a state where the voice recognition module 1192 or the iris recognition module 1193 is inactive for power saving, the user performs a predetermined operation, the voice recognition module 1192 or the iris recognition module 1192 switches from the inactive state to an activated state. The predetermined operations include a touch input to a touch key, a pushing-down operation of a mechanical key, and the like. On the other hand, the voice recognition module 1192 or the iris recognition module 1193 is configured in such a manner that when the predetermined application is performed, a recognition window pops up.

Figure 26:
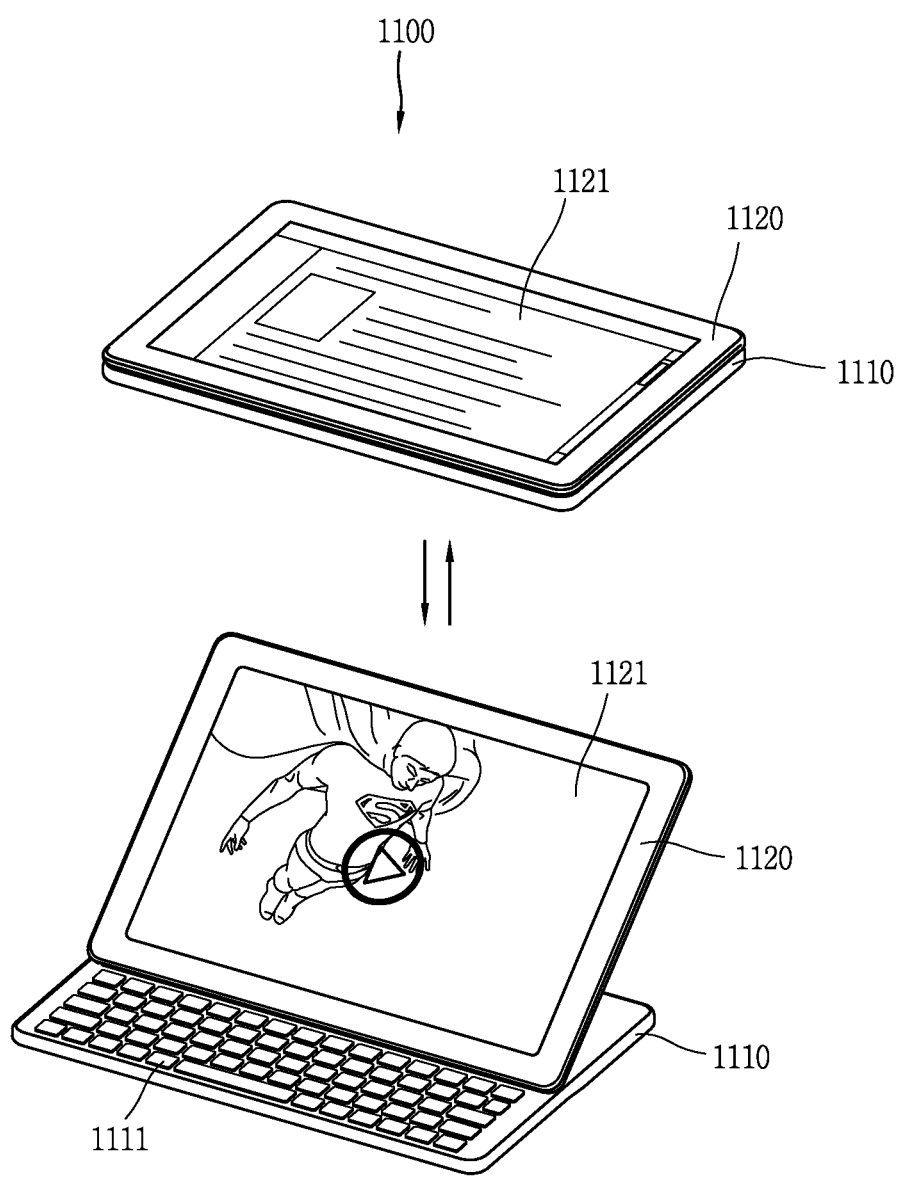
FIG. 26 is a diagram illustrating one example in which based on a state where a second body is arranged with respect to a first body, screen information that is displayed on a display unit is changed.

FIG. 26 is a diagram illustrating one example in which based on a state where the second body 1120 is arranged with respect to the first body 1110, screen information that is displayed on the display unit 1121 is changed. Based on the state where the second body 1120 is arranged with respect to the first body 1110, the controller controls the screen information that is displayed on the display unit 1121. For example, when in a state where the second body 1120 is arranged to cover the first body 1110 in an overlapping manner and the screen information in a first mode is displayed on the display unit 1121, the second body 1120 rotates relative to the second frame 1132, the screen information in a second mode different from the first mode is displayed on the display unit 1121.

The first mode may be a web search mode, a document creating mode or the like and the second mode may be a static or moving image reproducing mode or the like. As illustrated, in the state where the second body 1120 is arranged to cover the first body 1110 in an overlapping manner, the screen information associated with web search is displayed on the display unit 1121. Thereafter, when the second body 1120 rotates with respect to the first body 1110, the controller detects the rotation of the second body 1120 and thus changes the screen information that is displayed on the display unit 1121, to the screen information associated with reproducing of the moving image.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal comprising: a first body; a second body; and a hinge module connecting the second body to the first body such that the second body is movable relative to the first body, the hinge module including: a first frame rotatably connected to the first body; and a second frame connected to the first frame to support at least one portion of the second body in a supporting state, the second frame being connected to the second body such that the second frame is rotatable relative to the second body in order to allow the second body to rotate in the supporting state, wherein the second frame is rotatably connected to the first frame such that, when the first frame rotates relative to the first body, one end portion of the second body moves along one surface of the first body in a sliding manner, wherein the second body is configured such that the second body is rotatable about the one end portion relative to the second frame, wherein a locking recess is formed in the one end portion of the second body, wherein the first body includes a stopper, an end portion of the stopper being insertable into the locking recess when the one end portion of the second body moves in a sliding manner toward the stopper, and wherein the stopper includes a round portion such that the second body is smoothly rotatable relative to the second frame in a state when the second body is hooked onto the stopper.

2. The portable terminal of claim 1, further comprising a fixing portion that fixes the second body to the second frame in the supporting state.

3. The portable terminal of claim 2, wherein the fixing portion includes:
 a magnet at one of the second body and the second frame; and
 a metallic member at the other of the second body and the second frame such that a magnetic force of the magnet is exerted on the metallic member.

4. The portable terminal of claim 3, wherein the metallic member is configured to be changeable in polarity to change a direction of the magnetic force.

5. The portable terminal of claim 2, wherein the fixing portion includes:
 a locking hole formed at the second frame;
 a manipulating member installed in the second body such that the manipulating member is displaceable during a pushing-down operation; and
 a moving member configured to be movable by the displacement of the manipulating member, the moving member having a locking hook detachably engagable with the locking hole in response to displacement of the moving member.

6. The portable terminal of claim 5, wherein the fixing portion further includes an elastic member that exerts an elastic force on the manipulating member in order that the moving member, moved by the pushing-down operation of the manipulating member, returns to a previous position.

7. The portable terminal of claim 6, wherein the moving member is configured to move slidably on a rear surface of a display unit provided on the second body.

8. The portable terminal of claim 2, wherein the fixing portion includes:
 a projection protruding from one of the second body and the second frame; and
 an elastic member at the other one of the second body and the second frame, the elastic member including a hole into which the projection is inserted, the hole being changeable in shape when the projection is inserted into the hole.

9. The portable terminal of claim 1, wherein a projection is formed on at least one surface of the stopper, and wherein the locking recess includes: a first accommodation portion into which the end portion of the stopper is inserted when the one end portion of the second body moves in a sliding manner; and a second accommodation portion that extends downward from the first accommodation portion, the second accommodation portion being arranged to cover the projection when the second body rotates relative to the second frame.

10. The portable terminal of claim 1, further comprising:
 a first hook at the first frame; and
 a latch bar installed in the first body, the latch bar including a second hook configured to be hooked onto the first hook to fix the first frame to the first body and to move to release the first hook when a control command is applied.

11. The portable terminal of claim 10, further comprising:
 a motor configured to generate a driving force when the control command is applied;
 a pinion gear configured to rotate by the driving force of the motor, the pinion gear having teeth formed at regular intervals along a circumference of one side of the pinion gear to push the latch bar;
 a limit switch configured to transfer a driving-stop signal for stopping the motor; and
 an elastic member configured to provide an elastic force to return the latch bar to a previous position held prior to operation of the motor.

12. The portable terminal of claim 10, further comprising a torsion spring configured to provide an elastic force such that, when the latch bar moves to release the first hook, the first frame rotates relative to the first body.

13. The portable terminal of claim 10, wherein, when the control command is applied while the portable terminal is in a state where the second body is arranged to cover the first body and a display unit at the second body is inactive, the second body moves with respect to the first body into a tilted position and the display unit switches to an activate state.

14. The portable terminal of claim 10, wherein, when the portable terminal is in a state where the second body is arranged to cover the first body in an overlapping manner, screen information in a first mode is displayed on a display unit provided to the second body, and, when the second body rotates relative to the second frame, the screen information in a second mode different from the first mode is displayed on the display unit.

15. A portable terminal comprising: a first body; a second body; and a hinge module connecting the second body to the first body such that the second body is movable relative to the first body, the hinge module including: a first frame rotatably connected to the first body; a second frame connected to the first frame to support at least one portion of the second body in a supporting state, the second frame being connected to the second body such that the second frame is rotatable relative to the second body in order to allow the second body to rotate in the supporting state;
a touch sensor mounted in the second body, the touch sensor being configured to sense a predetermined touch input; a motor installed in the first body, the motor being configured to generate a driving force when the predetermined touch input is sensed;
a first gear configured to rotate by the driving force of the motor; and a second gear connected to a rotation shaft which rotatably connects the first frame to the first body, the second gear being engaged with the first gear such that the first frame rotates relative to the first body when the first gear rotates.

16. A portable terminal comprising: a first body; a second body configured to move between a first position in which the second body is arranged to cover the first body and a second position in which the second body is arranged to be inclined with respect to the first body; and a hinge module connecting the second body to the first body such that the second body is movable relative to the first body, the hinge module including: a first frame rotatably connected to the first body; and a second frame rotatably connected to the first frame, the second frame configured to support the second body when the second body moves relative to the first body, wherein the first frame is changeable in length such that when the second body is in the second position, an angle of the second body with respect to the first body is adjustable, wherein the second frame is rotatably connected to the first frame such that, when the first frame rotates relative to the first body, one end portion of the second body moves along one surface of the first body in a sliding manner, wherein a locking recess is formed in the one end portion of the second body, wherein the first body includes a stopper, an end portion of the stopper being insertable into the locking recess when the one end portion of the second body moves in a sliding manner toward the stopper, and wherein the stopper includes a round portion such that the angle of the second body with respect to the first body is adjustable in a state when the second body is hooked onto the stopper.

17. The portable terminal of claim 16, wherein the first frame includes:
a stationary member;
a moving member configured to be movable relative to the stationary member;
a guide rail installed in the stationary member along a direction of the relative movement of the moving member; and
a guide member installed in the moving member, the guide member being connected to the guide rail to guide the relative movement of the moving member.

18. A portable terminal comprising: a first body; a second body; and
a hinge module connecting the second body to the first body such that the second body is movable relative to the first body, the hinge module including: a first frame rotatably connected to the first body; and a second frame connected to the first frame to support at least one portion of the second body in a supporting state, the second frame being connected to the second body such that the second frame is rotatable relative to the second body in order to allow the second body to rotate in the supporting state; a first hook at the first frame; and a latch bar installed in the first body, the latch bar including a second hook configured to be hooked onto the first hook to fix the first frame to the first body and to move to release the first hook when a control command is applied;
a motor configured to generate a driving force when the control command is applied;
a pinion gear configured to rotate by the driving force of the motor, the pinion gear having teeth formed at regular intervals along a circumference of one side of the pinion gear to push the latch bar; a limit switch configured to transfer a driving-stop signal for stopping the motor; and an elastic member configured to provide an elastic force to return the latch bar to a previous position held prior to operation of the motor.

19. The portable terminal of claim 18, further comprising a torsion spring configured to provide an elastic force such that, when the latch bar moves to release the first hook, the first frame rotates relative to the first body.

20. The portable terminal of claim 18, wherein, when the control command is applied while the portable terminal is in a state where the second body is arranged to cover the first body and a display unit at the second body is inactive, the second body moves with respect to the first body into a tilted position and the display unit switches to an activate state.

21. The portable terminal of claim 18, wherein, when the portable terminal is in a state where the second body is arranged to cover the first body in an overlapping manner, screen information in a first mode is displayed on a display unit provided to the second body, and, when the second body rotates relative to the second frame, the screen information in a second mode different from the first mode is displayed on the display unit.

* * * * *